(12) United States Patent
Shramkova et al.

(10) Patent No.: US 12,214,493 B2
(45) Date of Patent: *Feb. 4, 2025

(54) OPTICAL MANIPULATION APPARATUS

(71) Applicant: InterDigital CE Patent Holdings, SAS, Paris (FR)

(72) Inventors: Oksana Shramkova, Liffré (FR); Laurent Blonde, Thorigné-Fouillard (FR); Valter Drazic, Betton (FR); Mitra Damghanian, Cesson-Sévigné (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/415,561

(22) PCT Filed: Dec. 10, 2019

(86) PCT No.: PCT/EP2019/084526
§ 371 (c)(1),
(2) Date: Jun. 17, 2021

(87) PCT Pub. No.: WO2020/126708
PCT Pub. Date: Jun. 25, 2020

(65) Prior Publication Data
US 2022/0059250 A1 Feb. 24, 2022

(30) Foreign Application Priority Data

Dec. 18, 2018 (EP) .................................... 18213584

(51) Int. Cl.
*B25J 7/00* (2006.01)
*G02B 3/00* (2006.01)
(Continued)

(52) U.S. Cl.
CPC .............. *B25J 7/00* (2013.01); *G02B 3/0043* (2013.01); *G02B 21/32* (2013.01); *G02B 27/56* (2013.01); *G02F 1/29* (2013.01)

(58) Field of Classification Search
CPC ........ B25J 7/00; G02B 3/0043; G02B 3/0037; G02B 27/56; G02B 21/32; G02F 1/29
(Continued)

(56) References Cited

U.S. PATENT DOCUMENTS 3,718,383 A 2/1973 Moore
6,099,146 A 8/2000 Imamura
(Continued)

FOREIGN PATENT DOCUMENTS

CN 1319191 A 10/2001
CN 1502050 A 6/2004
(Continued)

OTHER PUBLICATIONS

Gennarelli, G.et al., "A uniform asymptotic solution for the diffraction by a right-angled dielectric wedge" IEEE transactions on antennas and propagation, vol. 59 No. 3, Mar. 2011 pp. 898-903 (6 pages).
(Continued)

*Primary Examiner* — Nicole M Ippolito
(74) *Attorney, Agent, or Firm* — Klintworth & Rozenblat IP LLP

(57) ABSTRACT

A device configured for radiating a focused electromagnetic beam is proposed. Such device comprises: —a first (101) and a second (102) part having respectively a second $n_2$ and third $n_3$ refractive index and a first $W_1$ and second $W_2$; —a first contact area (100e1) intended to be between a host medium having a first refractive index n1 and in which the micro or nanoparticles are intended to be trapped or moved by a focused electromagnetic beam radiated by the device;
(Continued)

—a second contact area (100e2) between the first part and the second part; and —a third contact area (100e3) intended to be between the second part and the host medium. The focused electromagnetic beam results from a combination of at least two beams among a first (NJ1), a second (NJ2) and a third (NJ3) jet beams radiated respectively by the first, second and third contact areas when an incoming electromagnetic wave (IEM) illuminates the device. The device is configured for having a direction of propagation of the focused electromagnetic beam tilted in respect of a direction of propagation of the incoming electromagnetic wave.

18 Claims, 19 Drawing Sheets

(51) Int. Cl.
    *G02B 21/32*     (2006.01)
    *G02B 27/56*     (2006.01)
    *G02F 1/29*     (2006.01)

(58) Field of Classification Search
    USPC .......................................................... 250/251
    See application file for complete search history.

(56) References Cited

U.S. PATENT DOCUMENTS

| | | | |
|---|---|---|---|
| 6,721,485 B1 | 4/2004 | Nakamura | |
| 6,891,147 B2 | 5/2005 | Goto | |
| 7,142,363 B2 | 11/2006 | Sato | |
| 7,394,535 B1 | 7/2008 | Chen | |
| 7,738,346 B2 | 6/2010 | Ooi | |
| 8,885,997 B2 | 11/2014 | Nguyen | |
| 9,099,370 B2 | 8/2015 | Nishiwaki | |
| 9,140,602 B2 | 9/2015 | Narasimhan | |
| 9,297,939 B2 | 3/2016 | Palanchoke | |
| 9,383,582 B2 | 7/2016 | Tang | |
| 9,419,036 B2 | 8/2016 | Saitou | |
| 9,564,469 B2 | 2/2017 | Kim | |
| 9,766,467 B2 | 9/2017 | Sohn | |
| 9,827,209 B2 | 11/2017 | Kostamo | |
| 9,880,393 B2 | 1/2018 | Kim | |
| 9,891,436 B2 | 2/2018 | Wall | |
| 10,534,115 B1 | 1/2020 | Calafiore | |
| 10,866,360 B2 | 12/2020 | Khorasaninejad | |
| 11,163,175 B2* | 11/2021 | Boriskin | B82Y 20/00 |
| 11,204,452 B2* | 12/2021 | Paniagua Dominguez | G02B 5/1809 |
| 11,275,252 B2* | 3/2022 | Boriskin | G02B 27/0927 |
| 11,396,474 B2* | 7/2022 | Drazic | G02B 6/32 |
| 11,573,356 B2* | 2/2023 | Shramkova | G02B 27/4233 |
| 11,604,363 B2 | 3/2023 | Damghanian | |
| 2004/0198582 A1 | 10/2004 | Borrelli | |
| 2005/0002611 A1 | 1/2005 | Levola | |
| 2006/0124833 A1 | 6/2006 | Toda | |
| 2006/0250933 A1 | 11/2006 | Asada | |
| 2009/0190094 A1 | 7/2009 | Watanabe | |
| 2009/0205090 A1 | 8/2009 | Mimouni | |
| 2010/0091376 A1 | 4/2010 | Sano | |
| 2010/0134890 A1 | 6/2010 | Chen | |
| 2010/0188537 A1 | 7/2010 | Hiramoto | |
| 2011/0043918 A1 | 2/2011 | Crouse | |
| 2011/0235166 A1 | 9/2011 | Zhu | |
| 2012/0147373 A1 | 6/2012 | Kamimura | |
| 2013/0099343 A1 | 4/2013 | Toshikiyo | |
| 2013/0099434 A1 | 4/2013 | Yano | |
| 2013/0250421 A1 | 9/2013 | Wakabayashi | |
| 2013/0322810 A1 | 12/2013 | Robbins | |
| 2014/0192409 A1 | 7/2014 | Yamaguchi | |
| 2015/0063753 A1 | 3/2015 | Evans | |
| 2015/0219842 A1 | 8/2015 | Sqalli | |
| 2015/0286060 A1 | 10/2015 | Roh | |
| 2015/0301333 A1 | 10/2015 | Levesque | |
| 2015/0323800 A1 | 11/2015 | Nam | |
| 2015/0362641 A1 | 12/2015 | Boyraz | |
| 2015/0362841 A1 | 12/2015 | Zelsacher | |
| 2016/0033697 A1 | 2/2016 | Sainiemi | |
| 2016/0047951 A1 | 2/2016 | Eckstein | |
| 2016/0054172 A1 | 2/2016 | Roh | |
| 2016/0064172 A1 | 3/2016 | Kirbawy | |
| 2016/0064448 A1 | 3/2016 | Shin | |
| 2016/0070062 A1 | 3/2016 | Lipson | |
| 2016/0172390 A1 | 6/2016 | Numata | |
| 2016/0231568 A1 | 8/2016 | Saarikko | |
| 2016/0274281 A1 | 9/2016 | Lutolf | |
| 2017/0006278 A1 | 1/2017 | Vandame | |
| 2017/0012078 A1 | 1/2017 | Han | |
| 2017/0090206 A1 | 3/2017 | Kim | |
| 2017/0092668 A1 | 3/2017 | Kim | |
| 2017/0092676 A1 | 3/2017 | Yun | |
| 2017/0097510 A1 | 4/2017 | Sohn | |
| 2017/0098672 A1 | 4/2017 | Yun | |
| 2017/0179178 A1 | 6/2017 | Park | |
| 2017/0201658 A1 | 7/2017 | Rosenblatt | |
| 2017/0212348 A1 | 7/2017 | Fu | |
| 2017/0307886 A1 | 10/2017 | Stenberg | |
| 2017/0315346 A1 | 11/2017 | Tervo | |
| 2017/0351111 A1 | 12/2017 | Jeong | |
| 2018/0113313 A1 | 4/2018 | Tekolste | |
| 2018/0231771 A1 | 8/2018 | Schuck, III | |
| 2018/0252850 A1 | 9/2018 | Aoki | |
| 2018/0259691 A1 | 9/2018 | Wang | |
| 2018/0354844 A1* | 12/2018 | Drazic | G02B 6/32 |
| 2019/0101700 A1 | 4/2019 | Boriskin | |
| 2019/0121239 A1 | 4/2019 | Singh | |
| 2019/0243233 A1 | 8/2019 | Boriskin | |
| 2019/0257986 A1 | 8/2019 | Paniagua Dominguez | |
| 2020/0066811 A1 | 2/2020 | Cha | |
| 2020/0233223 A1 | 7/2020 | Shramkova | |
| 2020/0348526 A1* | 11/2020 | Boriskin | G02B 27/0927 |
| 2021/0041609 A1* | 2/2021 | Shramkova | G02B 5/1809 |
| 2021/0041709 A1* | 2/2021 | Damghanian | G02B 27/56 |
| 2021/0088802 A1 | 3/2021 | Murakami | |
| 2021/0233291 A1* | 7/2021 | Shramkova | G02B 27/1006 |
| 2022/0059250 A1* | 2/2022 | Shramkova | G02B 21/32 |

FOREIGN PATENT DOCUMENTS

| | | |
|---|---|---|
| CN | 1606704 A | 4/2005 |
| CN | 1661478 A | 8/2005 |
| CN | 1693928 A | 11/2005 |
| CN | 1756972 A | 4/2006 |
| CN | 1762009 A | 4/2006 |
| CN | 1898584 A | 1/2007 |
| CN | 101114031 A | 1/2008 |
| CN | 101114032 A | 1/2008 |
| CN | 101241202 A | 8/2008 |
| CN | 101263378 A | 9/2008 |
| CN | 101359094 A | 2/2009 |
| CN | 101467021 A | 6/2009 |
| CN | 101611333 A | 12/2009 |
| CN | 101688929 A | 3/2010 |
| CN | 102498374 A | 6/2012 |
| CN | 101799589 B | 5/2013 |
| CN | 103119498 A | 5/2013 |
| CN | 104718479 A | 6/2015 |
| CN | 105074511 A | 11/2015 |
| CN | 105765421 A | 7/2016 |
| CN | 106331445 A | 1/2017 |
| CN | 106772734 A | 5/2017 |
| CN | 106932845 A | 7/2017 |
| CN | 107462983 A | 12/2017 |
| CN | 108508506 A | 9/2018 |
| CN | 108885354 A | 11/2018 |
| CN | 108919399 A | 11/2018 |
| CN | 109073885 A | 12/2018 |
| CN | 109891318 A | 6/2019 |
| EP | 1406098 A1 | 4/2004 |
| EP | 1542043 A1 | 6/2005 |
| EP | 1904827 A2 | 4/2008 |
| EP | 2196729 | 6/2010 |
| EP | 2229938 | 9/2010 |

(56) References Cited

FOREIGN PATENT DOCUMENTS

| | | | | |
|---|---|---|---|---|
| EP | 2955753 | | 12/2015 | |
| EP | 3223062 | A1 | 9/2017 | |
| EP | 3223063 | A1 | 9/2017 | |
| EP | 3240046 | A1 | 11/2017 | |
| EP | 3312646 | A1 | 4/2018 | |
| EP | 3312660 | A1 | 4/2018 | |
| EP | 3312674 | A1 | 4/2018 | |
| EP | 3339938 | A1 | 6/2018 | |
| EP | 3385219 | A1 * | 10/2018 | ........... C03C 17/001 |
| EP | 3499278 | | 6/2019 | |
| EP | 3540479 | A1 | 9/2019 | |
| EP | 3540499 | | 9/2019 | |
| EP | 3540499 | A1 | 9/2019 | |
| EP | 3588150 | | 1/2020 | |
| EP | 3591700 | A1 | 1/2020 | |
| EP | 3671293 | | 6/2020 | |
| EP | 3671322 | A1 | 6/2020 | |
| GB | 2529003 | | 2/2016 | |
| JP | 2003005129 | A | 1/2003 | |
| JP | 2014134564 | | 7/2014 | |
| JP | 2016500160 | A | 1/2016 | |
| JP | 2017063198 | A | 3/2017 | |
| TW | 200502570 | A | 1/2005 | |
| TW | 201042286 | A | 12/2010 | |
| WO | 03007032 | A1 | 1/2003 | |
| WO | 2003025635 | A1 | 3/2003 | |
| WO | 2004094326 | A3 | 5/2005 | |
| WO | 2007031991 | A2 | 3/2007 | |
| WO | 2009083977 | A2 | 7/2009 | |
| WO | 2014036537 | A1 | 3/2014 | |
| WO | 2014044912 | | 3/2014 | |
| WO | 2017116637 | | 7/2017 | |
| WO | 2017116637 | A1 | 7/2017 | |
| WO | 2017131983 | | 8/2017 | |
| WO | 2017162880 | A1 | 9/2017 | |
| WO | 2017162882 | A1 | 9/2017 | |
| WO | 2017180403 | | 10/2017 | |
| WO | 2017180403 | A1 | 10/2017 | |
| WO | 2018052750 | A1 | 3/2018 | |
| WO | 2018102582 | | 6/2018 | |
| WO | 2018102582 | A1 | 6/2018 | |
| WO | 2018102834 | A2 | 6/2018 | |
| WO | 2020128030 | A1 | 6/2020 | |
| WO | 2021053182 | | 3/2021 | |

OTHER PUBLICATIONS

Wang, P. et al., "Ultra-high-sensitivity color imaging via a transparent diffractive-filter array and computational optics: supplementary material." Optica, Oct. 2015 (9 pages).
Fontaine, R. "The state-of-the-art of mainstream CMOS image sensors." In Proceedings of the International Image Sensors Workshop, 2015 (4 pages).
Wang, P. et al., "Computational single-shot hyper-spectral imaging based on a microstructured diffractive optic." In 2016 Conference on Lasers and Electro-Optics (CLEO), IEEE, 2016 (2 pages).
Palanchoke, U. et al., "Spectral sorting of visible light using dielectric gratings." Optics Express 25, No. 26, Dec. 2017 pp. 33389-33399 (11 pages).
Rakovich, Y. P. et al., "Photonic Nanojets in Coupled Microcavities." In The European Conference on Lasers and Electro-Optics, p. JSV2_3. Optical Society of America, 2009 (1 page).
Yang, J. et al., "Polychromatic see-through near-eye display design with two waveguides and a large field-of-view." In Optics, Photonics and Digital Technologies for Imaging Applications IV, vol. 9896, p. 989605. International Society for Optics and Photonics, 2016 (7 pages).
International Preliminary Report on Patentability for PCT/EP2019/084526 dated Jun. 16, 2021, 11 pages.
Liu, Cheng-Yang, "Photonic Jets Produced by Dielectric Micro Cuboids". Applied Optics, vol. 54, Issue 29, (2015), pp. 8694-8699.
Varghese, B. et al., "Influence of an edge height on the diffracted EM field distribution." In 2019 21st International Conference on Transparent Optical Networks (ICTON), pp. 1-4. IEEE, 2019.
Shramkova, O. et al. "Photonic nanojet generated by dielectric multi-material microstructure" META Jul. 2019, (2 pages).
International Preliminary Report on Patentability for PCT/EP2019/063802 dated Dec. 29, 2020, 8 pages.
Genevet, Patrice, et. al., "Recent Advances In Planar Optics: From Plasmonic To Dielectric Metasurfaces". Optica, vol. 4, No. 1, Jan. 2017, pp. 139-152.
Aieta, Francesco, et. al., "Multiwavelength Achromatic Metasurfaces By Dispersive Phase Compensation". Sciencexpress, 2015, (8 pages).
Khorasaninejad, Mohammadreza, et. al., "Achromatic Metasurface Lens At Telecommunication Wavelengths". Nano Letters, 2015, (5 pages).
Deng, Zi-Lan, et. al., "Wide-Angle And High-Efficiency Achromatic Metasurfaces For Visible Light". Optical Express, vol. 24, No. 20 pp. 23118-23128 (12 pages).
Avayu, Ori, et. al., "Composite Functional Metasurfaces For Multispectral Achromatic Optics". Nature Communications, 2017, pp. 1-7 (7 pages).
Nishiwaki, Seiji, et. al., "Efficient Colour Splitters for High-Pixel-Density Image Sensors". Nature Photonics, vol. 7, Mar. 2013, pp. 240-246.
International Search Report and Written Opinion of the International Searching Authority for PCT/EP2019/085489, dated Jan. 30, 2020, 11 pages.
Yi, Jianjia, et. al., "Coherent Beam Control With An All-Dielectric Transformation Optics Based Lens". Scientific Reports, vol. 6, No. 1, Jan. 5, 2016, pp. 1-8.
Zhao, Yanhui, et. al., "Beam Bending Via Plasmonic Lenses". Optics Express, vol. 18, No. 22, Oct. 25, 2010, pp. 23458-23465.
Jun, Young Chul, et. al., "Optical Manipulation With Plasmonic Beam Shaping Antenna Structures". Advances in OptoElectronicsm, (2012).
Khorasaninejad, Mohammadreza, et. al., "Super-Dispersive Off-Axis Meta-Lenses For Compact High Resolution Spectroscopy". Nano Letters, vol. 16, No. 6, (2016), pp. 3732-3737.
Liu, Zhaowei, et. al., "Tuning The Focus Of A Plasmonic Lens By The Incident Angle". Applied Physics Letters, vol. 88, No. 17, (2006), pp. 171108-1-171108-2.
Chen, Yiguo, et. al., "Engineering The Phase Front Of Light With Phase-Change Material Based Planar Lenses". Scientific Reports vol. 5, No. 1, Mar. 2, 2015, pp. 1-7.
Kong, Soon-Cheol, et. al., "Photonic Nanojet-Enabled Optical Data Storage". Optical Society of America, Optics Express, vol. 16, No. 18, Sep. 1, 2008, pp. 13713-13719.
Pacheco-Peña, V., et. al., "Terajets Produced By Dielectric Cuboids". Applied Physics Letters 105, 084102, (2014), doi: 10.1063/1.4894243, 5 pages.
Pacheco-Peña, V., et. al., "Multifrequency Focusing And Wide Angular Scanning Of Terajets". Optical Society of America, Optics Letters, vol. 40, No. 2, (2015), 5 pages.
Itagi, A. V., et. al., , "Optics of Photonic Nanojets". Optical Society of America. J. Opt. Soc. Am. A , Vo.22, Dec. 2005 pp. 2847-2858 (12 pages).
Heifetz, Alexander, et. al., "Subdiffraction Optical Resolution Of A Gold Nanosphere Located Within The Nanojet Of A Mie-Resonant Dielectric Microsphere". Optical Express, vol. 15, No. 25, (2007), 17334-17342.
Devilez, Alexis, et. al., "Three-Dimensional Subwavelength Confinement Of Light With Dielectric Microspheres". Optics Express, vol. 17, No. 4, Feb. 16, 2009, pp. 2089-2094.
Shen, Yuecheng, et. al., "Ultralong Photonic Nanojet Formed By A Two-Layer Dielectric Microsphere". Optical Letters, Optical Society of America, vol. 39, No. 14, Jul. 15, 2014, 4120-4123.
Ruiz, César Méndez, et. al., "Detection Of Embedded Ultrasubwavelength-Thin Dielectric Features Using Elongated Photonic Nanojets". Optical Express, vol. 18, No. 16, Aug. 2, 2010, pp. 16805-16812.
Geints, Yuri E., et. al., "Photonic Nanojet Calculations In Layered Radially Inhomogeneous Micrometer-Sized Spherical Particles". Optical Society of America, vol. 28, No. 8, Aug. 2011, 1825-1830.

(56) References Cited

OTHER PUBLICATIONS

Gu, Guoqiang, et. al. "Super-Long Photonic Nanojet Generated from Liquid-Filled Hollow Microcylinder". Optical Society of America, Optical Letters, vol. 40, No. 4, Feb. 15, 2015, pp. 625-628.
Mao, Xiurun, et. al., "Tunable Photonic Nanojet Formed By Generalized Luneburg Lens". Optics Express, vol. 23, No. 20, (2015), pp. 26426-26433.
Geints, Yu, E., et. al., "Modeling Spatially Localized Photonic Nanojets From Phase Diffraction Gratings". Journal of Applied Physics, vol. 119, No. 15, Apr. 21, 2016, pp. 153101-1-153101-6.
International Search Report and Written Opinion of the International Searching Authority for PCT/EP2019/055679 dated May 16, 2019, 10 pages.
International Preliminary Report on Patentability for PCT/EP19/055679 dated Sep. 15, 2020, 6 pages.
Kotlyar, Victor, et. al., "Photonic Nanojets Generated Using Square-Profile Microsteps". Optical Society of America, Applied Optics, vol. 53, No. 24, Aug. 20, 2014, pp. 5322-5329.
International Search Report and Written Opinion of the International Searching Authority for PCT/EP2019/055905 dated May 22, 2019, 12 pages.
International Preliminary Report on Patentability for PCT/EP2019/055905 dated Sep. 15, 2020, 8 pages.
Xiao, Jiasheng, et. al., "Design Of Achromatic Surface Microstructure For Near-Eye Display With Diffractive Waveguide". Optics Communications, vol. 452, (2019), pp. 411-416.
International Search Report and Written Opinion of the International Searching Authority for PCT/EP2019/063802 dated Sep. 16, 2019, 14 pages.
Ang, Angeleene S., et. al., "'Photonic Hook' Based Optomechanical Nanoparticle Manipulator". Scientific Reports, vol. 8. No. 2029, Published online: Feb. 1, 2018, pp. 1-7.
Chaumet, P. C., et. al., "Time-Averaged Total Force On A Dipolar Sphere In An Electromagnetic Field". Optics Letters, vol. 25, No. 15, (2000), pp. 1065-1067 (3 pages).
Xu, Chen, et. al., "Photon Nanojet Lens: Design, Fabrication and Characterization". Nanotechnology, vol. 27, No. 16, Mar. 4, 2016, pp. 1-6.
Yue, Liyang, et. al., "Photonic Hook: A New Curved Light Beam". Optics Letters, vol. 43, No. 4, Feb. 2018, pp. 771-774 (5 pages).
International Search Report and Written Opinion of the International Searching Authority PCT/EP2019/084526 dated Mar. 10, 2020, 15 pages.
Boriskin, Artem, et. al., "Near Field Focusing By Edge Diffraction". Optics Letters, vol. 43, No. 16, Aug. 2018, pp. 4053-4056 (4 pages).
Shramkova, Oksana, et. al., "Localized Photonic Jets Generated By Step-Like Dielectric Microstructures". IEEE 20th International Conference on Transparent Optical Networks (ICTON), (2018), pp. 1-4. (4 pages).
Liu, Cheng-Yang, et. al., "Localized Photonic Nanojets Formed By Core-Shell Diffraction Gratings". Integrated Optics: Physics and Simulations III, International Society for Optics and Photonics, vol. 10242, (2017), p. 102420W (4 pages).
International Search Report and Written Opinion of the International Searching Authority for PCT/EP2019/063739 dated Aug. 8, 2019, (11 pages).
International Preliminary Report on Patentability for PCT/EP2019/063739 dated Jan. 5, 2021, (7 pages).
International Search Report and Written Opinion of the International Searching Authority for PCT/EP2019/086776 dated Mar. 6, 2020, 13 pages.
International Search Report and Written Opinion for PCT/EP2021/057273 dated Jun. 30, 2021 (15 pages).
International Preliminary Report on Patentability for PCT/EP2019/085489 dated Jun. 16, 2021, (8 pages).
International Preliminary Report on Patentability for PCT/EP2019/086776 dated Jun. 16, 2021, (9 pages).
Teranishi, N. et al.,"Evolution of optical structure in image sensors." In 2012 International Electron Devices Meeting, pp. 24-1. IEEE, 2012 (4 pages).

Nishiwaki, S. et al., "Highly Sensitive Image Sensors Using Micro Color Splitters." ITE Technical Report vol. 37 No. 47, Dec. 2014 (2 pages).
Chen, Q. et al., "Nanophotonic image sensors." Small 12, No. 36, 2016: 4922-4935 (14 pages).
Neves, A. A. R., "Photonic nanojets in optical tweezers." Journal of Quantitative Spectroscopy and Radiative Transfer 162, Mar. 17, 2015 (20 pages).
Eisen, L., et al., "Total internal reflection diffraction grating in conical mounting." Optics communications 261, No. 1, 2006, pp. 13-18 (6 pages).
J. R. DeVore, "Refractive Indices of Rutile and Sphalerite," J. Opt. Soc. Am. 41, pp. 416-419, 1951 (4 pages).
Evola, T., "Diffractive optics for virtual reality displays." Journal of the Society for Information Display 14, No. 5, 2006 pp. 467-475 (9 pages).
Zhang, Li, et al., "CE4-related: History-based Motion Vector Prediction", Joint Video Experts Team (JVET) of ITU-T SG 16 WP 3 and ISO/IEC JTC 1/SC 29/WG 11, Document: JVET-K0104-v5, 11th Meeting: Ljubljana, SI, Jul. 10-18, 2018 (7 pages).
Tao, Z. et al., "Design of polarization-dependent color filters based on all-dielectric metasurfaces for dynamic modulation of color HSV", 11th International Congress on Engineered Materials Platforms for Novel Wave Phenomena (Metamaterials), 2017, 3 pages.
Lotti, F. et al., "Nanoparticle-based metasurfaces for angular-independent spectral filtering applications", 2017 Conference on Lasers and Electro-Optics Europe & European Quantum Electronics Conference (CLEO/Europe-EQEC), 2017.
Mahani, F. F., et al., "Optimization of plasmonic color filters for CMOS image sensors by genetic algorithm", 2nd Conference on Swarm Intelligence and Evolutionary Computation (CSIEC), 2017, 4 pages.
Gordon, James P., "Radiation Forces and Momenta in Dielectric Media", Phys. Rev. A vol. 8, 14—Published Jul. 1, 1973, 8 pages. Available online at: http://totuvach.free.fr/Articles/gordon73.pdf.
Wang, Hoatian, et al., "Trapping and manipulating nanoparticles in photonic nanojets", Optics Letters vol. 41 No. 7, Apr. 2016, 4 pages.
Cui, Xudong, et al., "Optical forces on metallic nanoparticles induced by a photonic nanojet", Optics Express, vol. 16, Issue 18, Oct. 2008, p. 13560-13568 (9 pages).
Zheng, Zhu, et al., "Optical trapping with focused Airy beams", Applied Optics vol. 50, Issue 1, 2011, pp. 43-49 (7 pages).
Siviloglou, Georgios A., et al., "Accelerating finite energy Airy beams", Apr. 15, 2007, vol. 32, No. 8, Optics Letters, pp. 979-981 (3 pages).
Čižmámar, Thomas, et al., "Optical conveyor belt for delivery of submicron objects" Applied Physics Letters, vol. 86, Issue 17, Apr. 25, 2005, 3 pages.
V. Garces-Chavez, et al., "Simultaneous micromanipulation in multiple planes using a self-reconstructing light beam", Nature vol. 419, Sep. 12, 2002, 145-147 (3 pages).
Bosanac, Lana, et al., "Efficient Optical Trapping and Visualization of Silver Nanoparticles", Nano Letters 2008, vol. 8, No. 5, pp. 1486-1491 (6 pages).
Ashkin, A., et al., "Observation of a single-beam gradient force optical trap for dielectric particles", Optics Letters vol. 11, Issue 5, May 1986 pp. 288-290 (3 pages).
Ahskin, A., et al., "Optical trapping and manipulation of viruses and bacteria", SCIENCE, Mar. 1987, vol. 235, Issue 4795, pp. 1517-1520 (4 pages).
Block, Steven M., et al., "Bead movement by single kinesin molecules studied with optical tweezers", Nature, vol. 348, Nov. 1990 pp. 348-352 (5 pages).
Jones, P. H., et al., "Trapping and manipulation of microscopic bubbles with a scanning optical tweezer", Applied Physics Letters, vol. 89, Issue 8, Aug. 21, 2006 (3 pages).
X. Tsampoula, et al., "Femtosecond cellular transfection using a nondiffracting light beam", Applied Physics Letters, vol. 91, Issue 5, Jul. 30, 2007 (3 pages).
Siviloglou, Georgios A., et al., "Observation of Accelerating Airy Beams", Physics Review Letters, vol. 99, Issue 21;Published Nov. 20, 2007 (4 pages).

(56) References Cited

OTHER PUBLICATIONS

Berry, M. V., et al., "Nonspreading wave packets", American Journal of Physics, vol. 47, Iss. 3, Mar. 1979 (4 pages).
Yannopapas, Vassilios, "Photonic nanojets as three-dimensional optical atom traps: A theoretical study", Optics Communications, vol. 285, Issue 12, pp. 2952-2955, Jun. 1, 2012, 3 p.
Zhang, Peng, et al., "Trapping and guiding microparticles with morphing autofocusing Airy beams", Optics Letters, vol. 36, No. 15, Aug. 2011, pp. 2883-2885 (3 pages).
Liu, Yujie, et al., "Total internal reflection diffraction grating in conical mounting and its application in planar display", International Conference on Photonics and Optical Engineering (icPOE 2014), vol. 9449, pp. 9449-9449-6, 2015 (6 pages).
Zhanjun, Yan, et al., "Virtual display design using waveguide hologram in conical mounting configuration." Optical Engineering, Sep. 2011, 50:50-50-9 (8 pages).

* cited by examiner

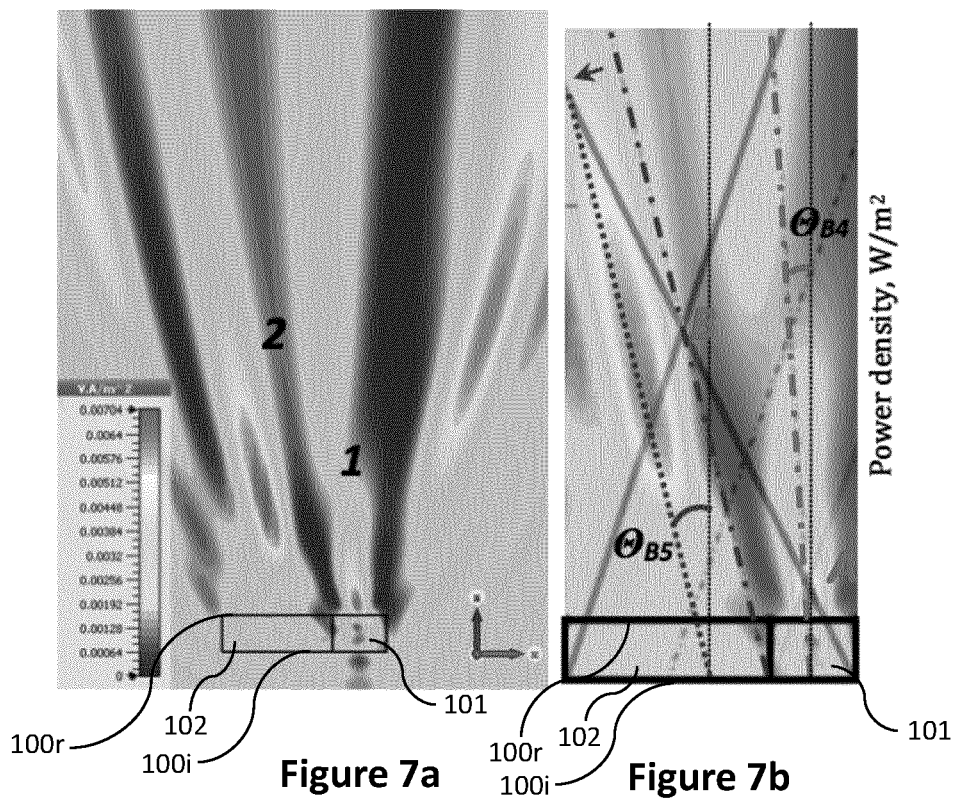
Figure 7a  Figure 7b
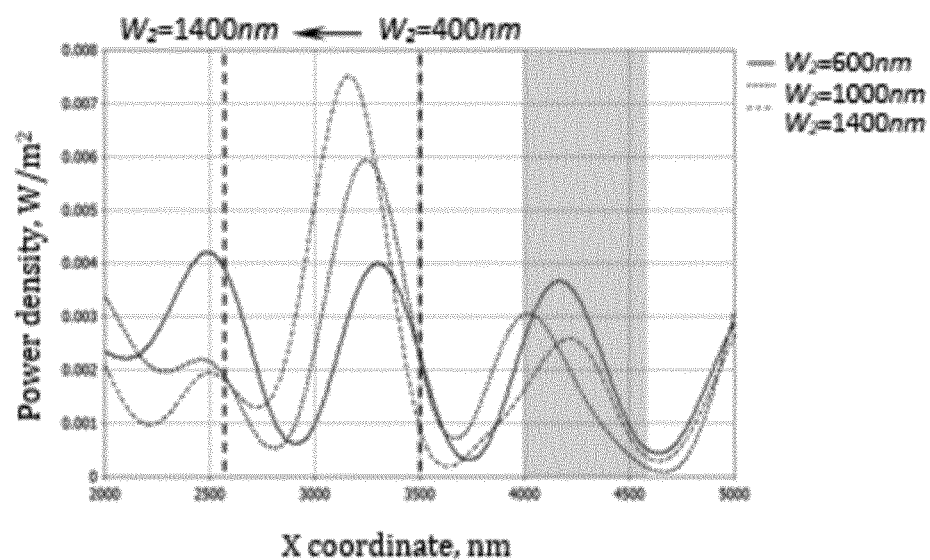
Figure 7c

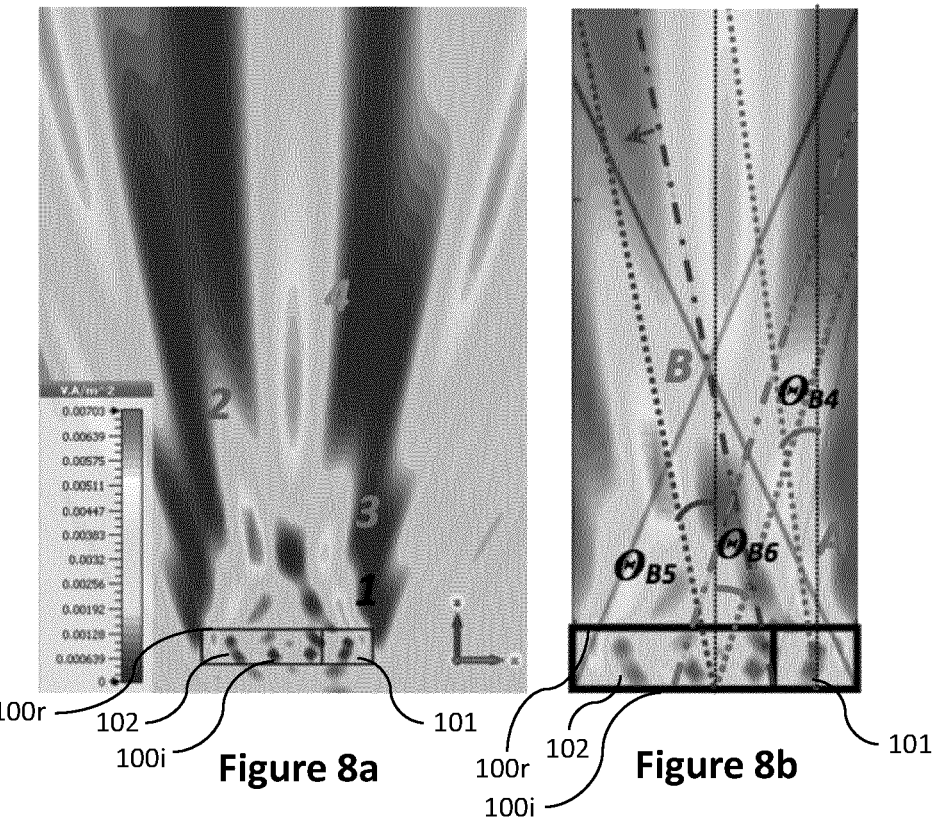
Figure 8a  Figure 8b
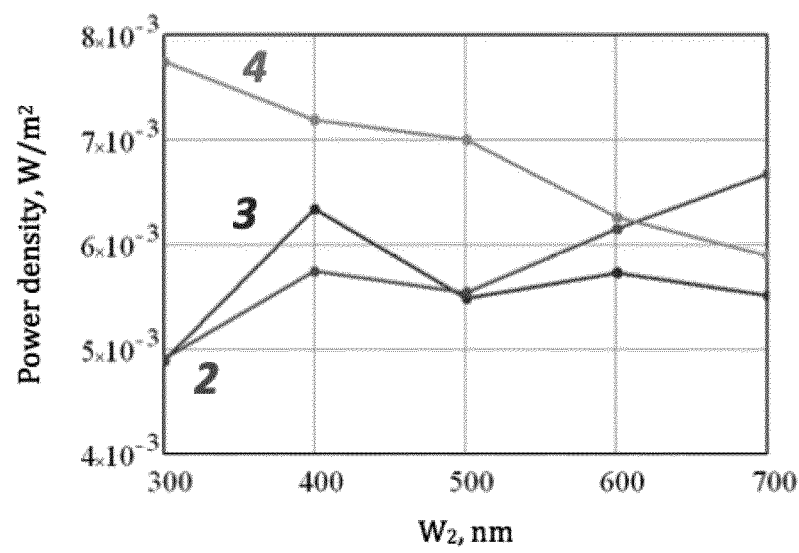
Figure 8c

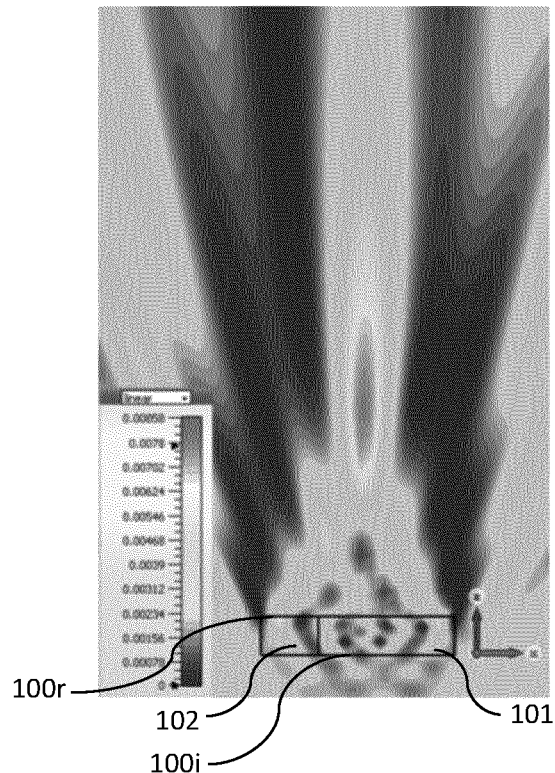
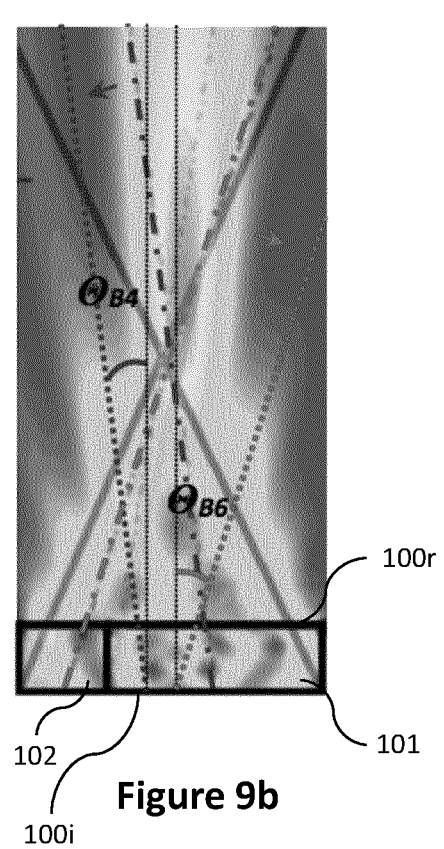
Figure 9a
Figure 9b
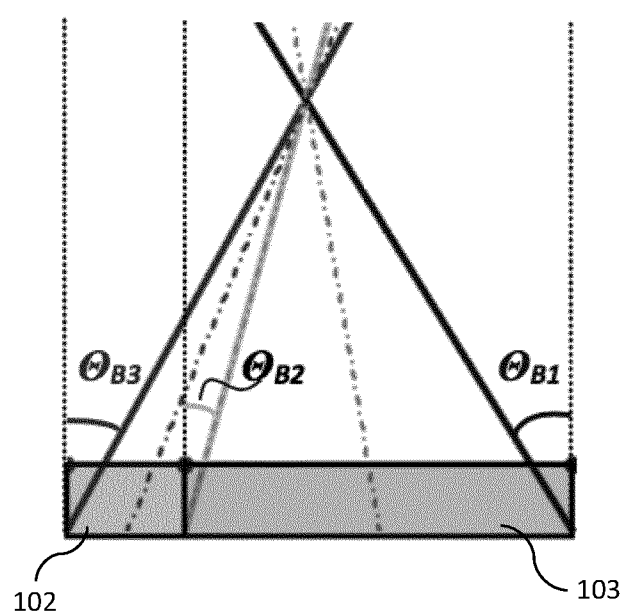
Figure 9c

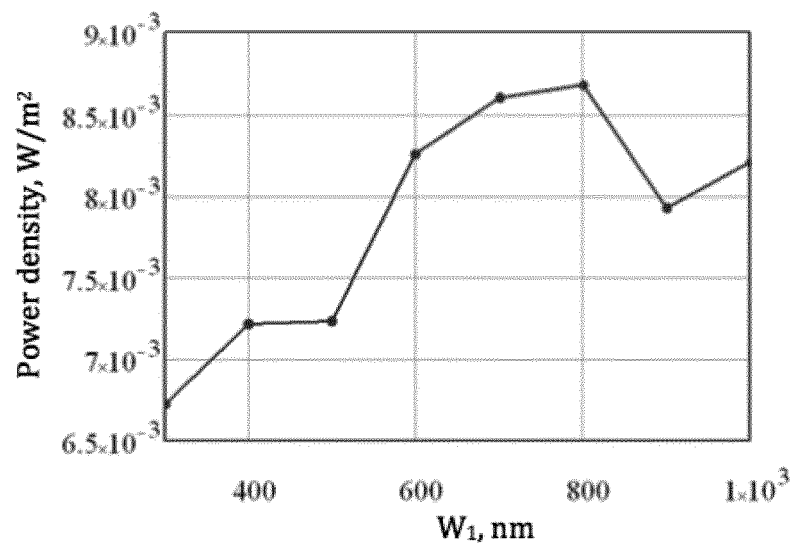
Figure 9d
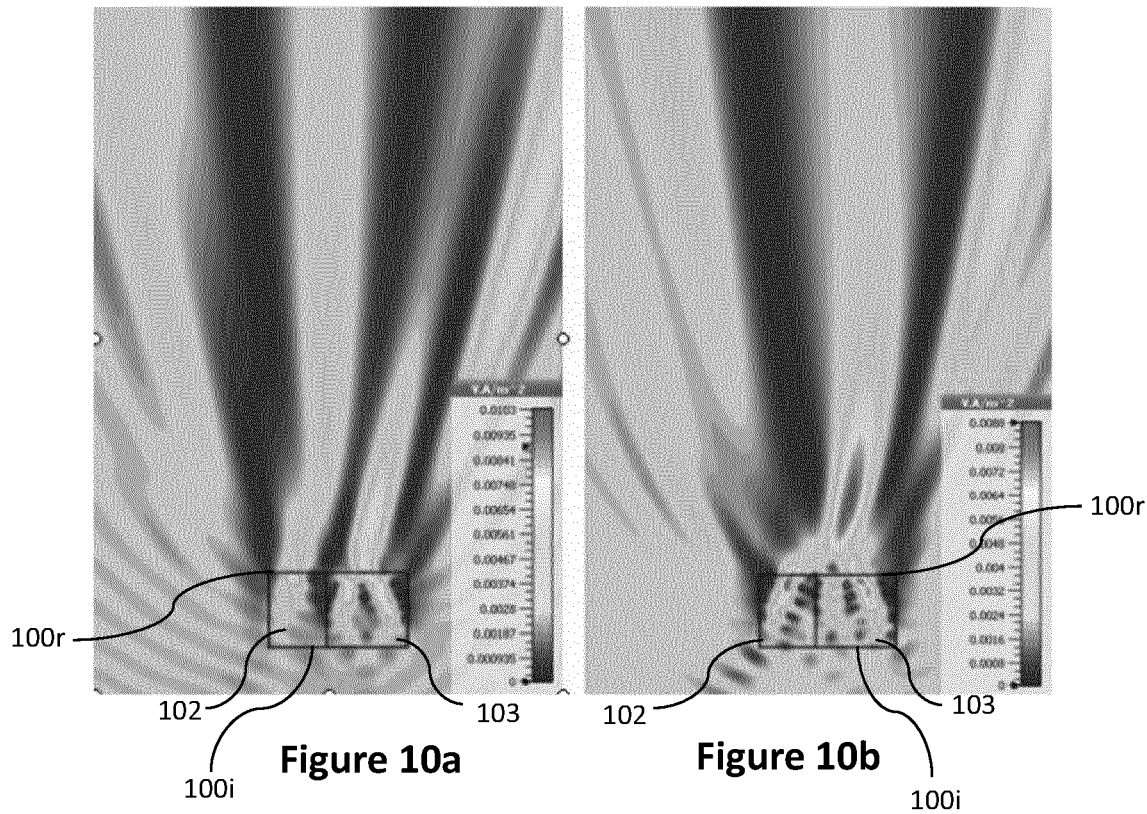
Figure 10a  Figure 10b

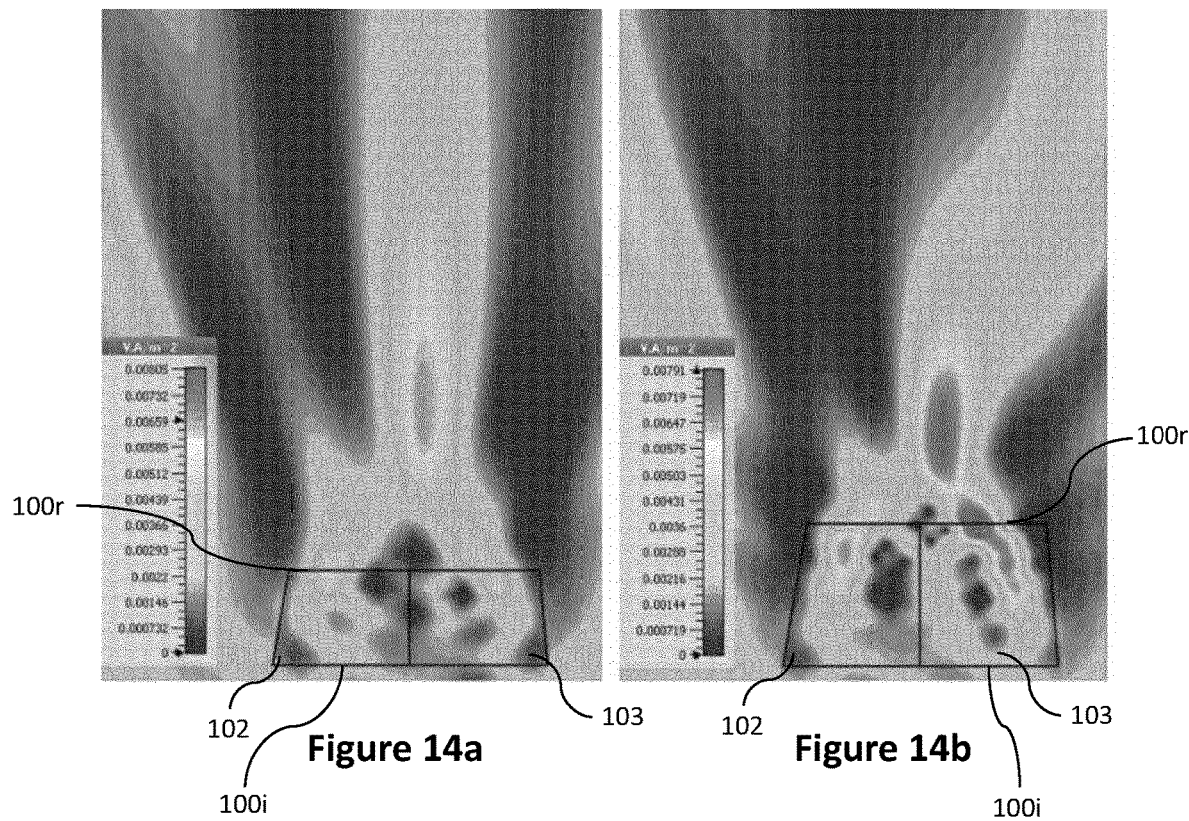
Figure 14a
Figure 14b
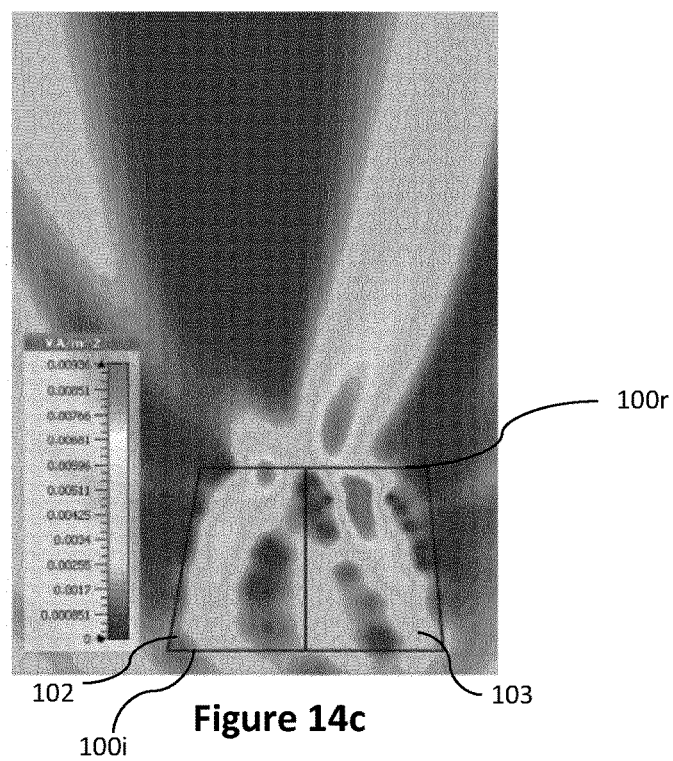
Figure 14c

Figure 15a
Figure 15b
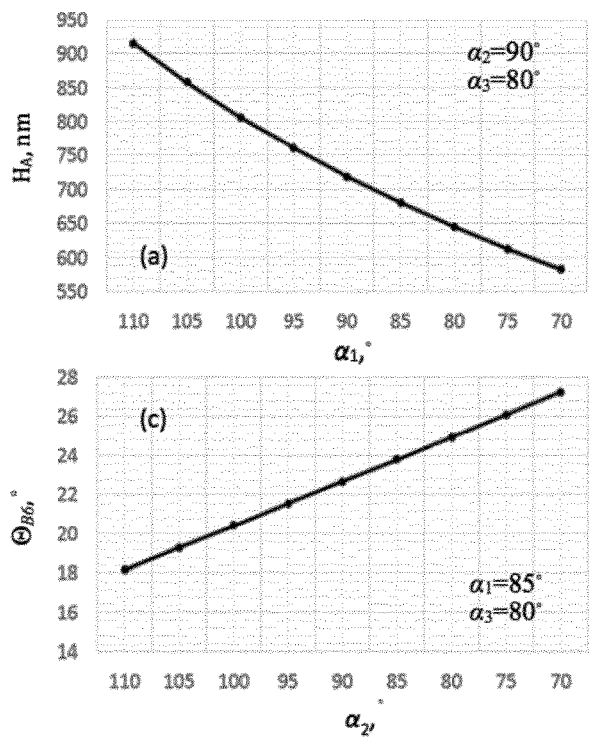
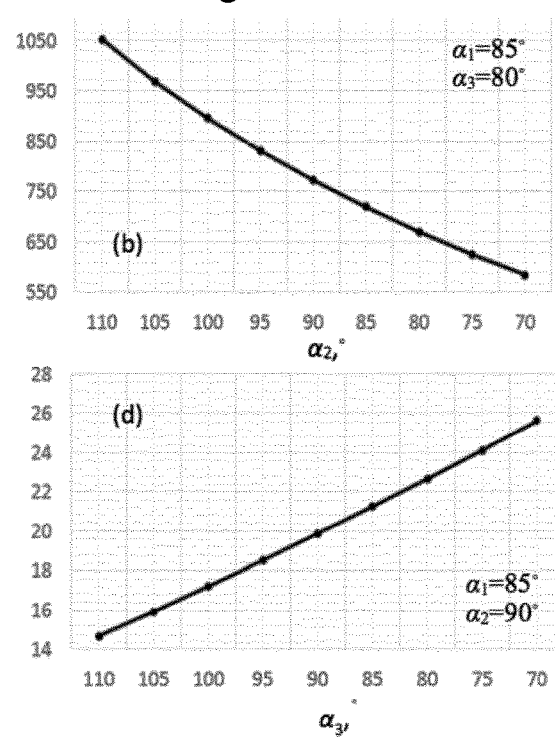
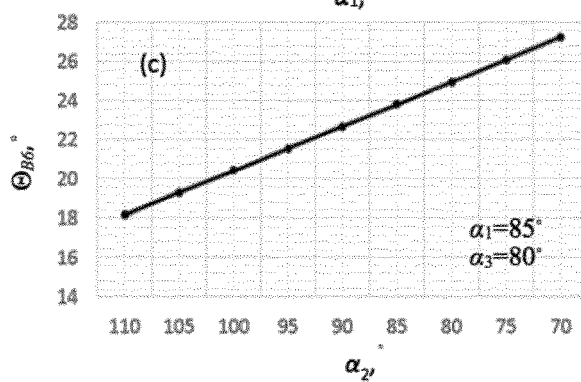
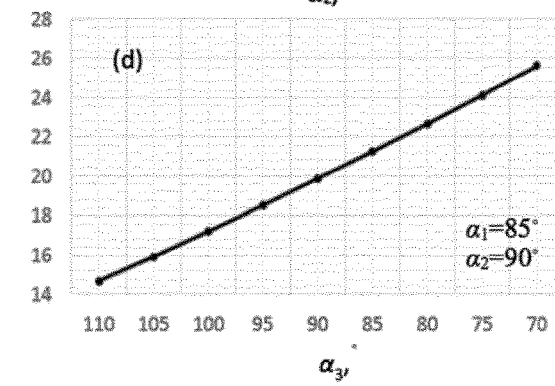
Figure 15c
Figure 15d
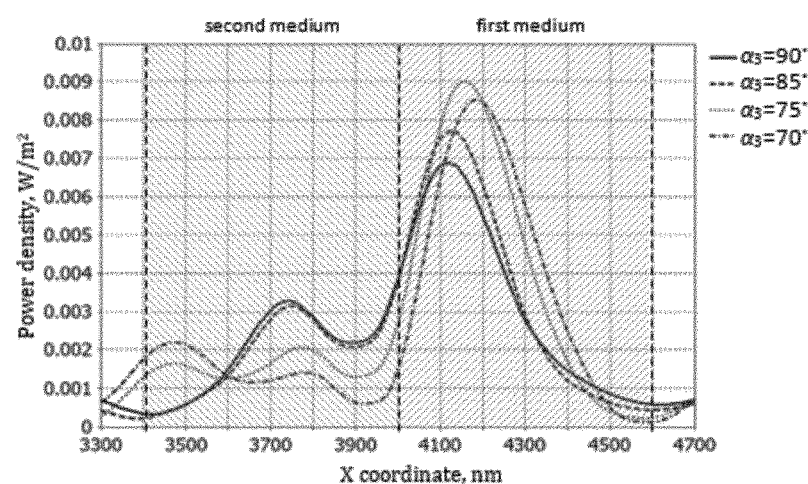
Figure 16

OPTICAL MANIPULATION APPARATUS

The present application is a national stage application under 35 U.S.C. § 371 of International Application No. PCT/EP2019/084526, entitled "OPTICAL MANIPULATION APPARATUS", filed on Dec. 10, 2019, which claims benefit from European Patent Application Serial No. 18213584.8, entitled "OPTICAL MANIPULATION APPARATUS FOR TRAPPING OR MOVING MICRO OR NANOPARTICLES", filed Dec. 18, 2018.

1. FIELD OF THE DISCLOSURE

The present disclosure relates to the field of optics and photonics, and more specifically to an optical manipulation device that may be used for example for trapping or moving micro or nanoparticles.

The disclosure can be of interest in any field where neutral particles have to be trapped and/or manipulated as for instance in atomic physics, nonlinear physics, biology and medicine, etc.

2. TECHNOLOGICAL BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Photonic condensed optical beams, or photonic "nanojets" generally relate to the generation of a transverse beam width smaller than the diffraction limit and to propagation over several wavelengths without significant divergence. The structured field of nanojets may induce specific optical forces providing the possibility for micro or nanoparticles manipulation along the nanojet EM (for "ElectroMagnetic") field trajectories.

Since optical manipulation devices (like optical tweezers) are a powerful non-invasive tool in biological and medical application, the study of micro or nanoparticles manipulation based on the nanojet has stimulated researchers' interest. However, the previous works regarding nanojet-induced optical forces focused on trapping particles along an axis of symmetry of the device used to generate the nanojet.

Recently, the asymmetric dielectric system creating a curved photonic jet ("photonic hook") was introduced to generate the optical forces for moving particles in a curved trajectory as disclosed for instance in the article by A. S. Ang, A. Karabchevsky, I. V. Minin, O. V. Minin, S. V. Sukhov and A. S. Shalin: "'*Photonic Hook' based optomechanical nanoparticle manipulator*", Scient. Rep., 2018. It was demonstrated that a particle could go around a glass obstacle or be stably trapped near glass and gold obstacles, which allows new applications in optical manipulation of micro or nanoparticles.

There is thus a need for a new type of optical manipulation device providing more flexible nanoparticle manipulation, in particular through the generation of curved jet beams.

3. SUMMARY

A particular aspect of the present disclosure relates to a device configured for radiating a focused electromagnetic beam in a dielectric host medium having a first refractive index $n_1$, when an incoming electromagnetic wave illuminates a first face of the device, named illumination face. Such a device comprises:
- a first material having a second refractive index $n_2$ and having a first width $W_1$ along a direction of extension of the first face, named X-axis; and
- a second material in contact with the first part and having a third refractive index $n_3$, having a second width $W_2$ along the X-axis, with n1<n3<n2, and with $W_1+W_2$ being greater than an equivalent wavelength $\lambda$ in the host medium of the incoming electromagnetic wave. The first and second materials extend along a direction orthogonal to the illumination face, named Z-axis, from the illumination face up to the radiating face of each part, opposite to the illumination face. The first and second materials having respectively a first height H1 and a second height H2 along the Z-axis, where $|H2-H1| \leq \lambda/4$. The device is configured for having, when the device is in contact with the dielectric host medium and when the incoming electromagnetic wave illuminates the illumination face:
- a first contact area between the dielectric host medium and the first material, the first contact area radiating a first jet beam in a near field zone;
- a second contact area between the first material and the second material, the second contact area radiating a second jet beam in the near field zone;
- a third contact area between the material and the dielectric host medium, the The focused electromagnetic beam results from a combination of at least two beams among the first, second and third jet beams. The device is configured for having a direction of propagation of the focused electromagnetic beam being tilted in respect of a direction of propagation of the incoming electromagnetic wave.

Thus, the present disclosure proposes a new and inventive solution for trapping or moving micro or nanoparticles.

More particularly, when the device comprised in the claimed optical manipulation apparatus is illuminated by the incoming electromagnetic wave, the resulting focused electromagnetic beam (or resulting jet beam) is generated in a direction that is tilted in respect of the direction of propagation of the incoming electromagnetic wave. In that case, the electromagnetic field lines of the outgoing focused electromagnetic beam present a curvature allowing the micro or nanoparticles to be trapped or moved, even around or behind objects present in the vicinity of the radiating face of the device from which the focused electromagnetic beam comes out of the device. This allows for a more flexible manipulation of the micro or nanoparticles.

According to one embodiment, the direction of propagation of the focused electromagnetic beam is tilted in respect of a direction of propagation of the incoming electromagnetic wave as a function of at least part of:
- the first $n_1$, second $n_2$ and third $n_3$ refractive indexes;
- the first $W_1$ and second $W_2$ widths; and
- the first H1 and second H2 heights.

According to one embodiment, the focused electromagnetic beam results from a combination of the first, second and third jet beams.

According to one embodiment, $n_3 \geq \sqrt{n_1 n_2}$, $W_1 = W_2$ and $H1 \geq H_A$, with $H_A$ a height, along the Z-axis and relative to the illumination face, of the intersection point of the first and second jet beams.

According to one embodiment, $n_3 < \sqrt{n_1 n_2}$ and $W_2 > W_1$.

According to one embodiment, $n_3 < \sqrt{n_1 n_2}$, $W_2 < W_1$ and $H1 \geq H_A$, with $H_A$ the height, along the Z-axis and relative to the illumination face, of an intersection point of the first and second jet beams.

According to one embodiment, $n_3 > \sqrt{n_1 n_2}$, $W_2 < W_1$ and $H1$ is targeted to be equal to $H_A - \lambda/2$, with $H_A$ the height, along the Z-axis and relative to the illumination face, of an intersection point of the first and second jet beams.

According to one embodiment, the height $H_A$ fulfils $$H_A = \frac{W_1}{\tan\Theta_{B1} + \tan\Theta_{B2}}, \Theta_{B1}$$

and $\Theta_{B2}$ being respectively radiation tilt angles of the first and second jet beams in respect of the direction of propagation of the incoming electromagnetic wave.

Thus, the device is configured for having the focused electromagnetic beam tilted in respect of the direction of propagation of the incoming electromagnetic wave e.g. when the incoming electromagnetic wave presents a normal incidence relative to the illumination face of the device.

According to one embodiment, $\Theta_{B1}$ and $\Theta_{B2}$ are targeted to be respectively equal to $$90° - \frac{\Theta_{TIR1} + \alpha_1}{2}$$

and to $$90° - \frac{\Theta_{TIR2} + \alpha_2}{2},$$

where angles $\alpha_1$ and $\alpha_2$ are respectively the base angles of the first and second contact areas relative to the X-axis, and where $\Theta_{TIR1}$ and $\Theta_{TIR2}$ are respectively limit angles of refraction associated with the first and third contact areas.

Thus, the device is configured for having the focused electromagnetic beam tilted in respect of the direction of propagation of the incoming electromagnetic wave e.g. when the first and second parts have nonvertical contact areas relative to the illumination face.

According to one embodiment, $$\Theta_{TIR1} = \sin^{-1}\left(\frac{n_1}{n_2}\right) \text{ and } \Theta_{TIR2} = \sin^{-1}\left(\frac{n_3}{n_2}\right).$$

According to one embodiment, the equivalent wavelength in the host medium, $\lambda$, of the incoming electromagnetic wave belongs to the visible light spectrum. For instance, the equivalent wavelength in the host medium of the incoming electromagnetic wave belongs to the range going from 390 nm to 700 nm.

According to one embodiment, at least one of the first and second materials belongs to the group comprising: glass, plastic, a polymer material, oxides and nitrides.

Another particular aspect of the present disclosure relates to an optical manipulation system comprising a device as described above (in any of the disclosed embodiments) and an electromagnetic source configured for generating the incoming electromagnetic wave.

Another particular aspect of the present disclosure relates to the use of a device as described above (in any of the disclosed embodiments) or of an optical manipulation system as described above (in any of the disclosed embodiments) for trapping or moving micro or nanoparticles in the dielectric host medium.

4. LIST OF FIGURES

Other features and advantages of embodiments shall appear from the following description, given by way of indicative and non-exhaustive examples and from the appended drawings, of which:

FIGS. 7a and 7b illustrate respectively the power density distribution in the XZ-plane and the schematic distribution of the jet beams generated by the device of FIG. 1 when $\lambda$=550 nm, $n_1$=1, $n_2$=1.8, $n_3$=1.3, $W_1$=600 nm, $W_2$=1400 nm and H1=H2=400 nm;

FIG. 7c illustrates the schematic distribution of the main jet beams of FIGS. 7a and 7b in the cut-plane $Z_0$=1900 nm and for different values of $W_2$;

FIGS. 8a and 8b illustrate respectively the power density distribution in the XZ-plane and the schematic distribution of the jet beams generated by the device of FIG. 1 when $\lambda$=550 nm, $n_1$=1, $n_2$=1.8, $n_3$=1.6, $W_1$=600 nm, $W_2$=1400 nm and H1=H2=400 nm;

FIG. 8c illustrates the power density distribution of the hot spots of the jet beams of FIGS. 8a and 8b as a function of $W_2$;

FIGS. 9a and 9b illustrate respectively the power density distribution in the XZ-plane and the schematic distribution of the jet beams generated by the device of FIG. 1 when $\lambda=550$ nm, $n_1=1$, $n_2=1.8$, $n_3=1.6$, $W_1=1400$ nm, $W_2=600$ nm and H1=H2=400 nm;

FIG. 9c illustrates the schematic distribution of the jet beams generated by the device of FIG. 1 when $\lambda=550$ nm, $n_1=1$, $n_2=1.8$, $n_3=1.6$, $W_1=1960$ nm, $W_2=600$ nm, H1=H2=400 nm;

FIG. 9d illustrates the power density distribution of the hot spots of the jet beams of FIGS. 9a and 9b as a function of $W_1$;

FIGS. 10a and 10b illustrate the power density distribution in a XZ-plane of the jet beams generated by the device of FIG. 1 when $\lambda=550$ nm, $n_1=1$, $n_2=1.8$, $W_1=1000$ nm, $W_2=700$ nm, H1=H2=900 nm, and when $n_3=1.3$ (FIG. 10a) or $n_3=1.6$ (FIG. 10b);

Figure 1:
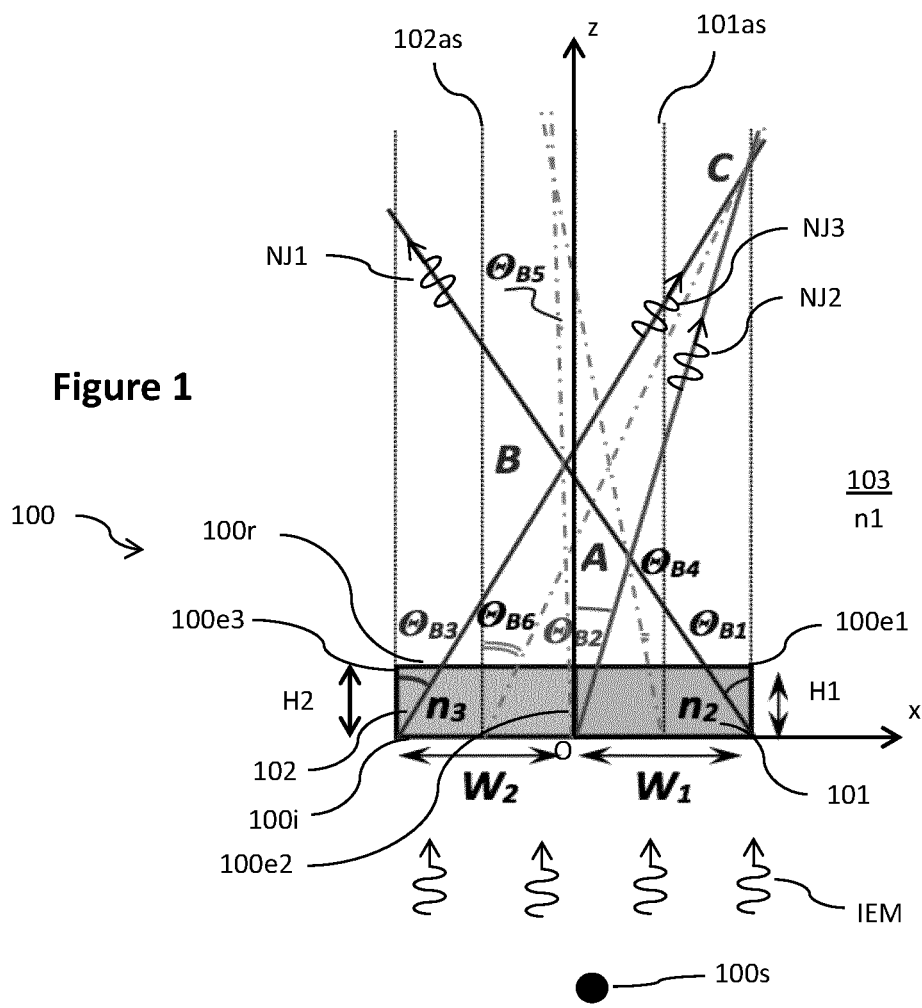
FIG. 1 illustrates the cross-section view, in the XZ-plane, of a device in contact with a dielectric host medium, the device comprising two parts of two different materials according to an embodiment of the present disclosure.
Figure 11A:
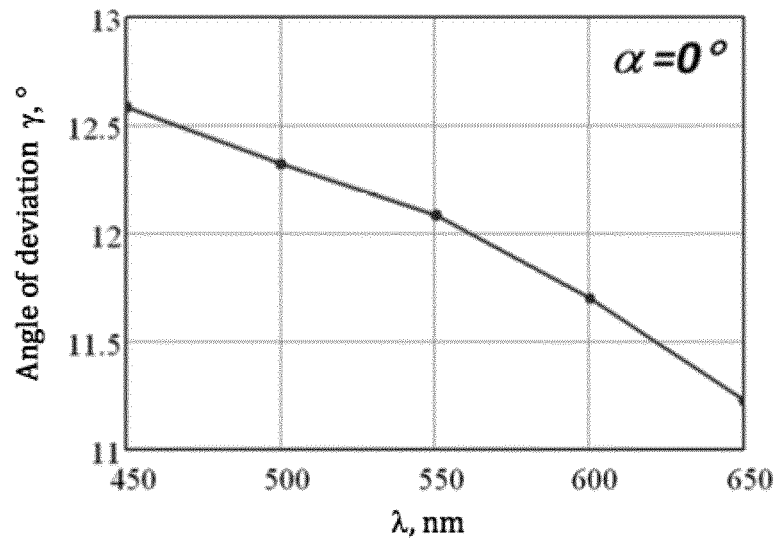
Figure 11B:
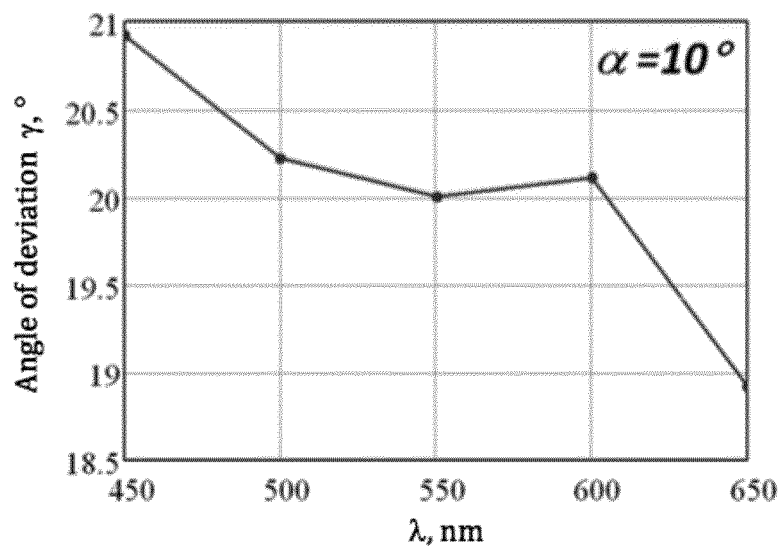

FIGS. 11a and 11b illustrate the angle of deviation, relative to the direction of propagation of the incoming electromagnetic wave, of the focused jet beam generated by the device of FIG. 1 when $\lambda=550$ nm, $n_1=1$, $n_2=1.8$, $n_3=1.6$, $W_1=1000$ nm, $W_2=700$ nm, H1=H2=900 nm, and when $\alpha=0°$ (FIG. 11a) or $\alpha=10°$ (FIG. 11b), with $\alpha$ the angle of incidence of the incoming electromagnetic wave relative to the direction normal to the surface of the illuminated face of the device.

Figure 12:
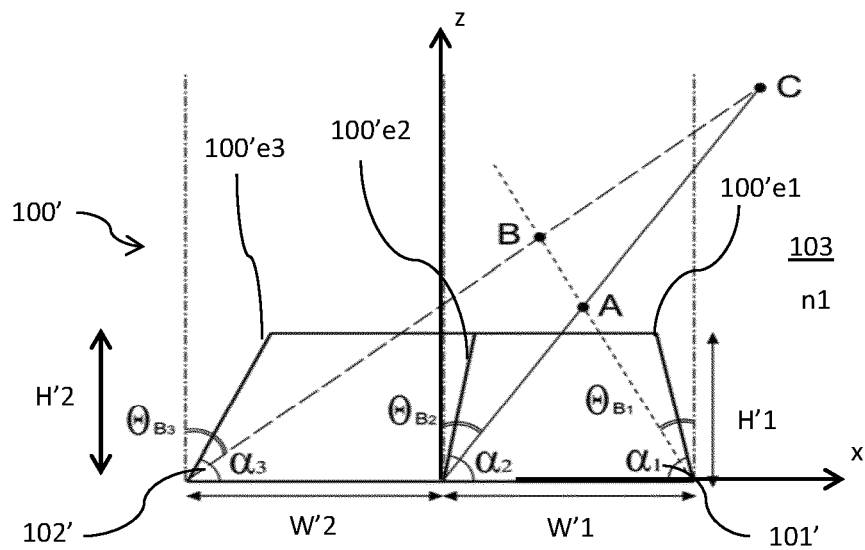
Figure 13A:
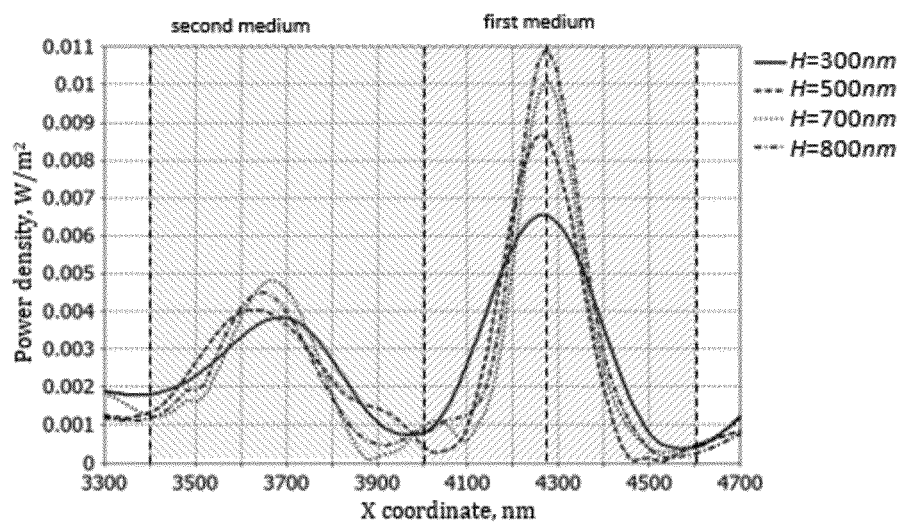
Figure 13B:
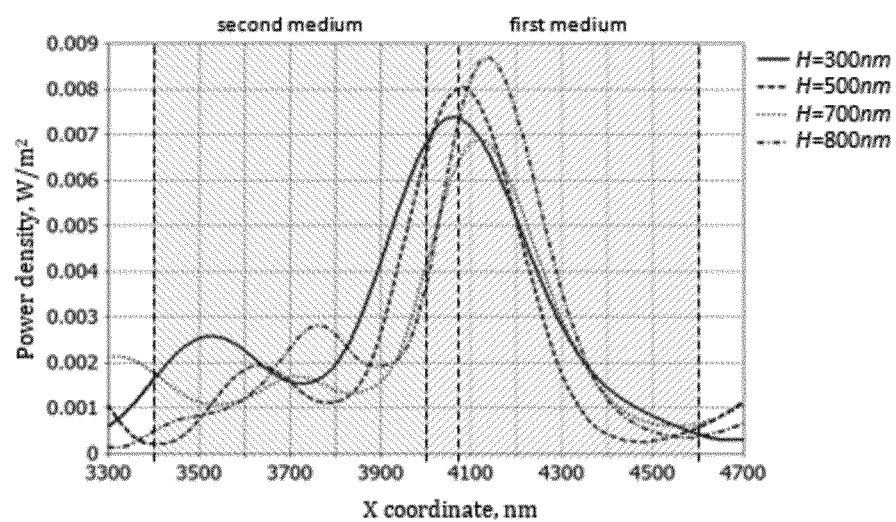
Figures 17A, 17B:
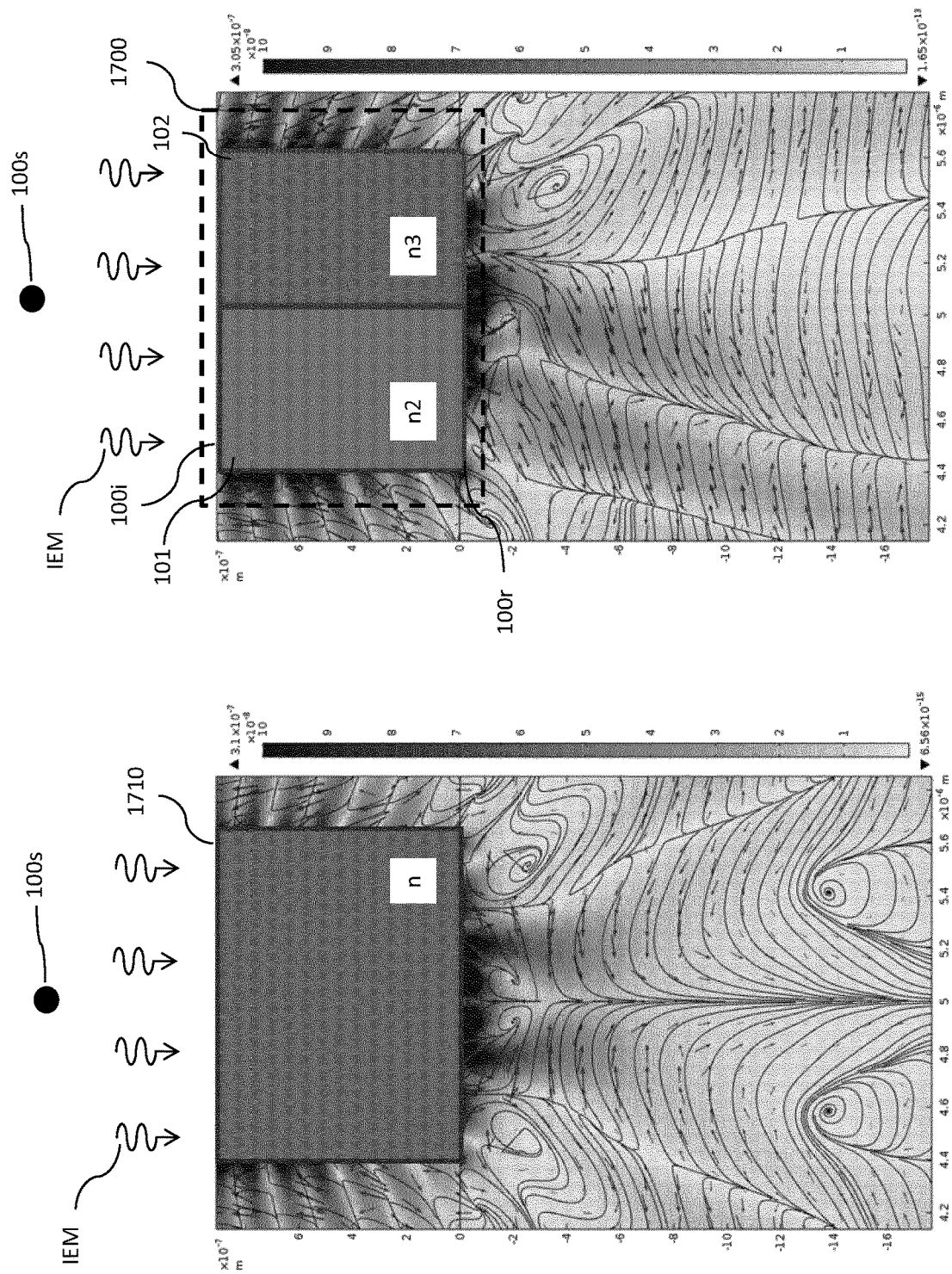

FIG. 12 illustrates the cross-section view, in the XZ-plane, of a device comprising two parts of two different materials according to another embodiment of the present disclosure;

FIGS. 13a and 13b illustrate the power density distribution along the X-axis of the jet beams generated by the device of FIG. 12 when $\lambda=550$ nm, $n_1=1$, $n_2=1.8$, $W_1=W_2=600$ nm, $\alpha_1=85°$, $\alpha_2=90°$, $\alpha_3=80°$, and in the cut-plane $Z_0=550$ nm with $n_3=1.3$ (FIG. 13a); and in the cut-plane $Z_0=1000$ nm with $n_3=1.6$ (FIG. 13b);

FIGS. 14a to 14c illustrate the power density distribution in a XZ-plane of the jet beams generated by the device of FIG. 12 when $\lambda=550$ nm, $n_1=1$, $n_2=1.8$, $n_3=1.6$, $W_1=W_2=600$ nm, $\alpha_1=85°$, $\alpha_2=90°$, $\alpha_3=80°$, and when H1=H2=400 nm (FIG. 14a), H1=H2=600 nm (FIG. 14b), or H1=H2=900 nm (FIG. 14c);

FIGS. 15a and 15b illustrate the specific height $H_A$ as a function of the base angles $\alpha_1$, $\alpha_2$ and $\alpha_3$ of the device of FIG. 12 when $n_1=1$, $n_2=1.8$, $n_3=1.6$ and $W_1=W_2=600$ nm;

FIGS. 15c and 15d illustrate the deviation angle $\Theta_{86}$ as a function of the base angles $\alpha_1$, $\alpha_2$ and $\alpha_3$ of the device of FIG. 12 when $n_1=1$, $n_2=1.8$, $n_3=1.6$ and $W_1=W_2=600$ nm;

FIG. 16 illustrates the power density distribution along the X-axis and in the cut-plane $Z_0=1000$ nm of the jet beams generated by the device of FIG. 12 for different values of the base angle $\alpha_3$ when $\lambda=550$ nm, $n_1=1$, $n_2=1.8$, $n_3=1.6$, $W_1=W_2=600$ nm, H1=H2=800 nm, $\alpha_1=85°$, $\alpha_2=90°$;

FIGS. 17a and 17b illustrate the optical forces generated by a single part material having a refractive index of n=n1=n2=1.6 (FIG. 17a), and by an optical manipulation apparatus comprising the device of FIG. 1 when $\lambda=550$ nm, $n_1=1$, $n_2=1.8$, $n_3=1.6$, $W_1=W_2=600$ nm and when H1=H2=900 nm (FIG. 17b).

Figures 18A, 18B:
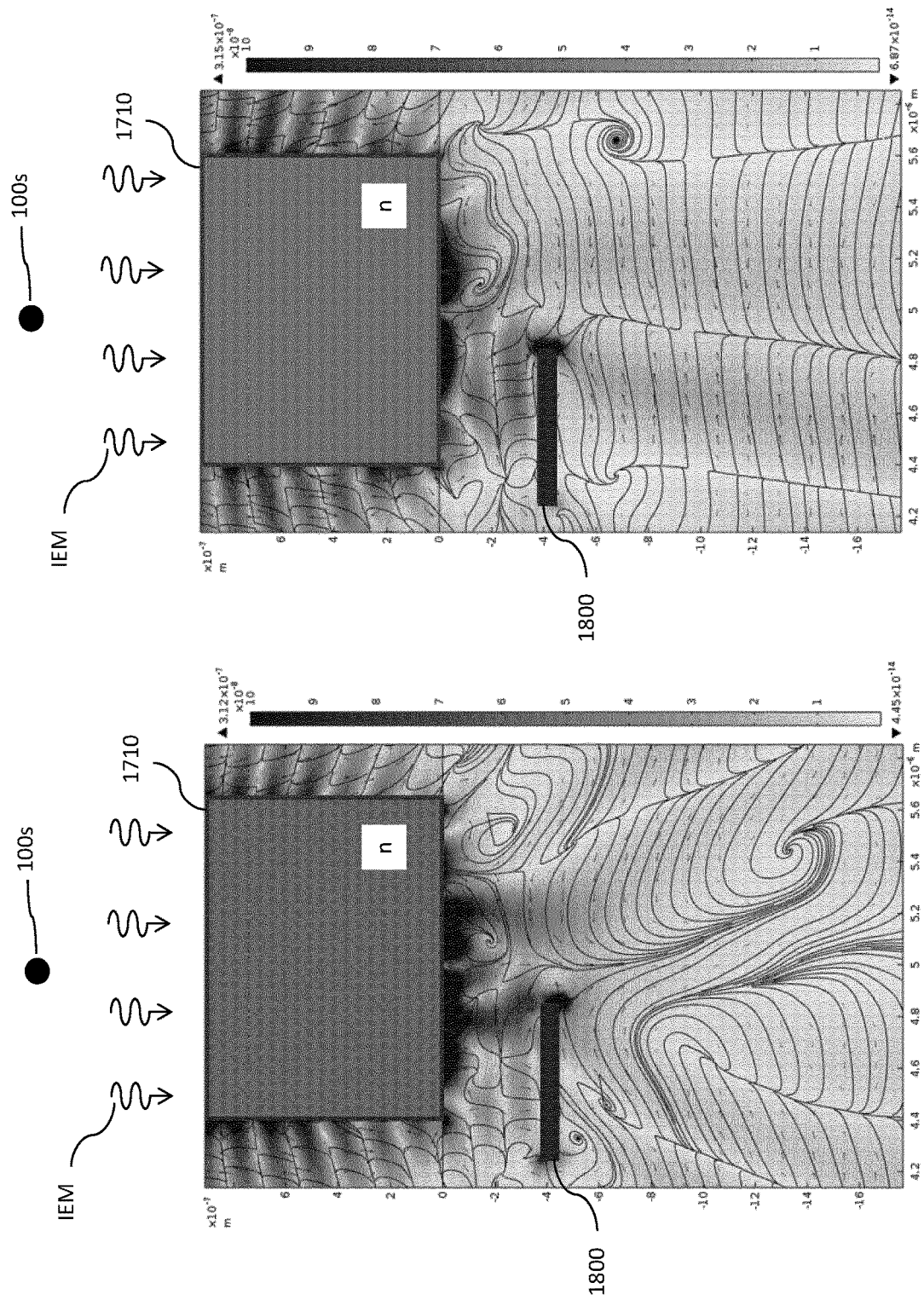
Figure 18D:
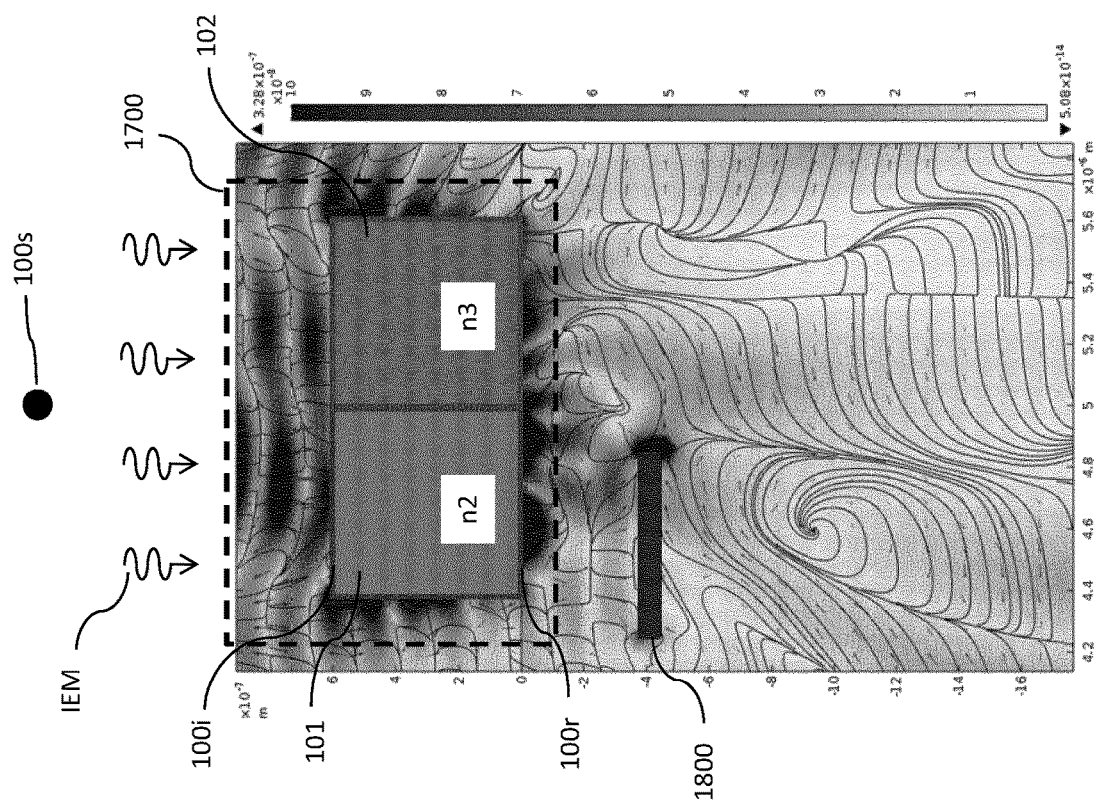
Figure 18C:
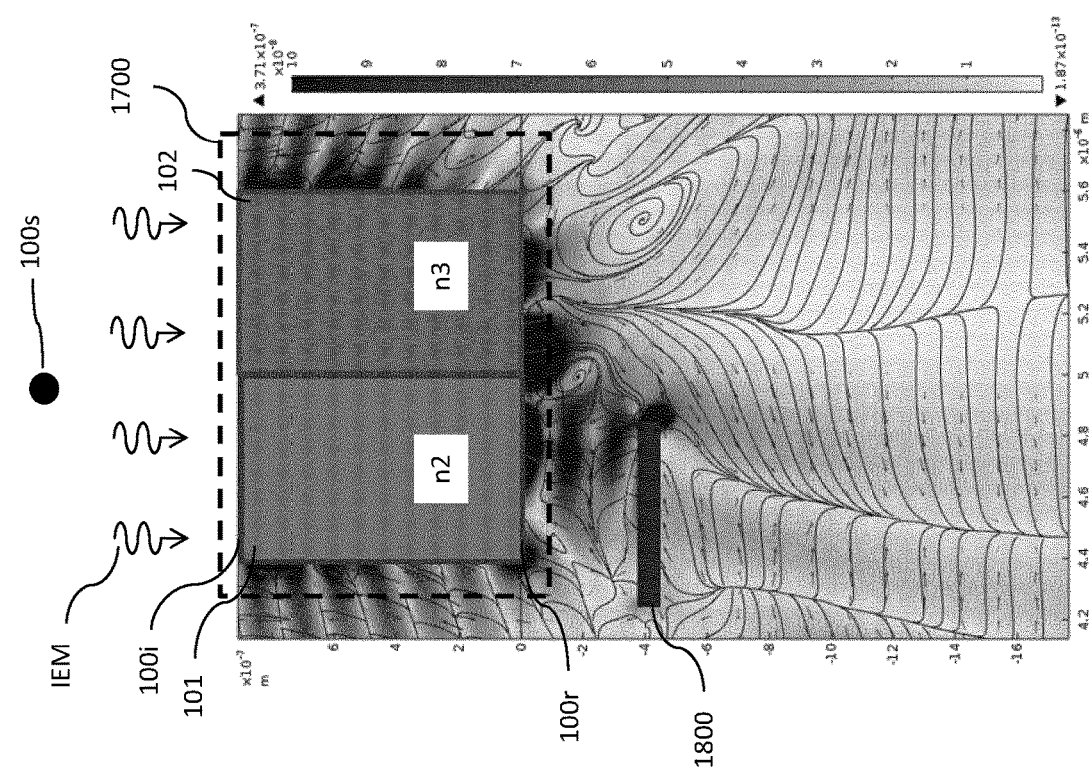
Figures 19A, 19B:
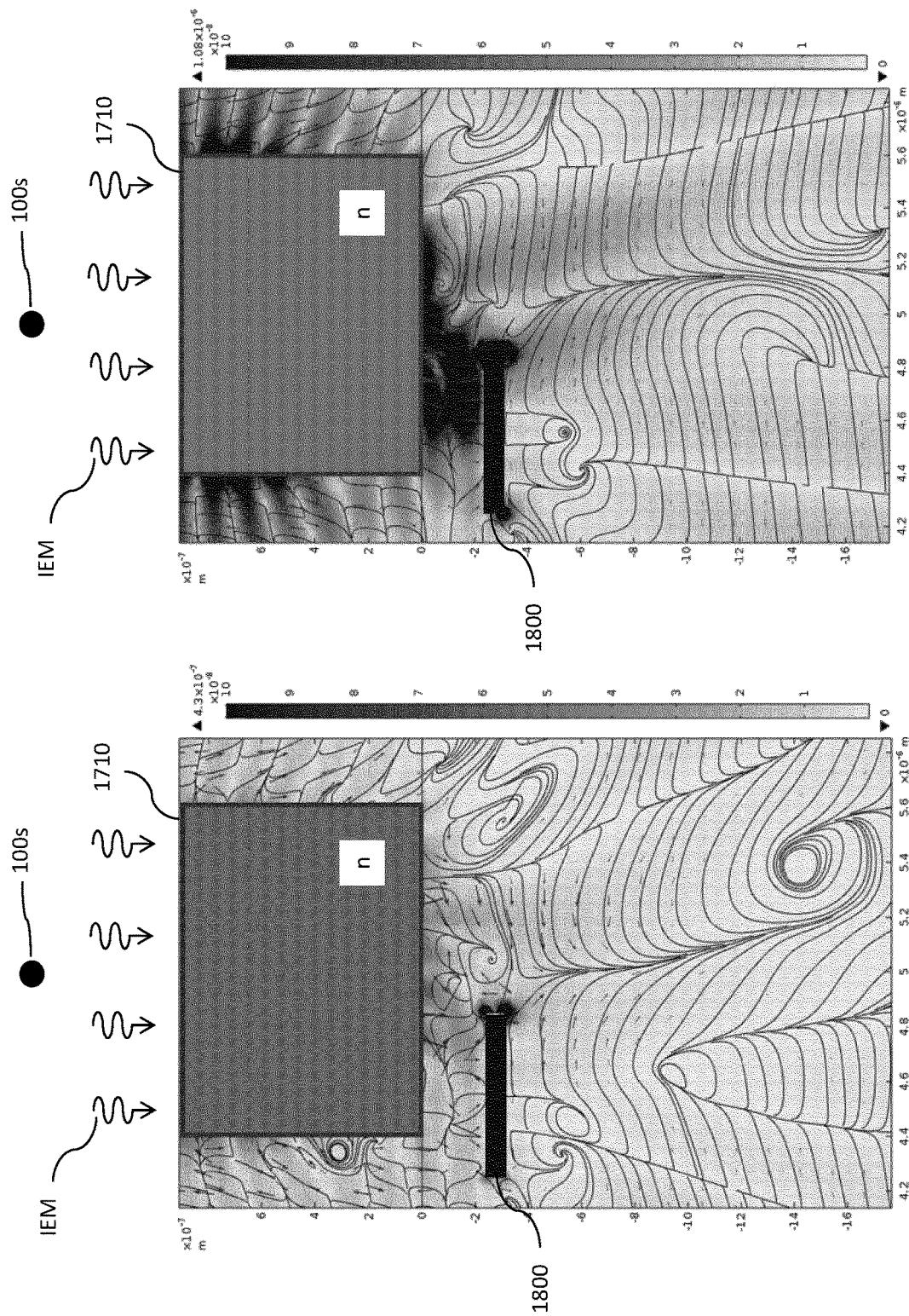
Figures 19C, 19D:
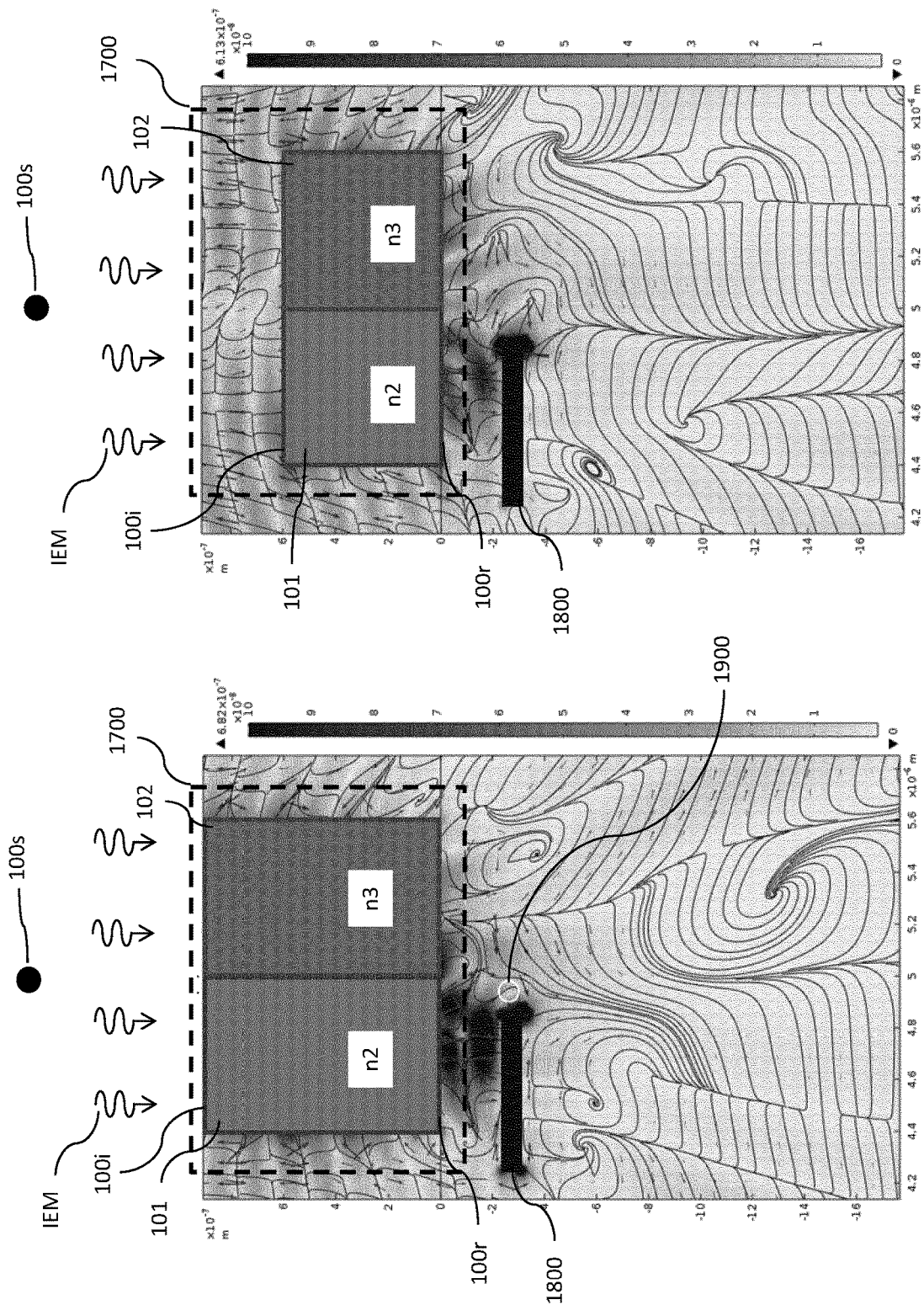

FIGS. 18a and 18b illustrate the optical forces generated by a single part material having a refractive index n in presence of an obstacle when n=1.6 and H=900 nm (FIG. 18a), and when n=1.8 and H=900 nm (FIG. 18b);

FIGS. 18c and 18d illustrate the optical forces generated by an optical manipulation apparatus according to the disclosure and in presence of an obstacle when $n_2=1.8$, $n_3=1.6$ and H1=H2=900 nm (FIG. 18c), and when $n_2=1.8$, $n_3=1.6$ and H1=H2=600 nm (FIG. 18d);

FIGS. 19a and 19b illustrate the optical forces generated by a single part material having a refractive index n in presence of an obstacle when n=1.6 and H=900 nm (FIG. 19a), and when n=1.8 and H=900 nm (FIG. 19b);

FIGS. 19c and 19d illustrate the optical forces generated by an optical manipulation apparatus according to the disclosure and in presence of an obstacle when $n_2=1.8$, $n_3=1.6$ and H1=H2=900 nm (FIG. 19c), and when $n_2=1.8$, $n_3=1.6$ and H1=H2=600 nm (FIG. 19d).

The components in the figures are not necessarily to scale, emphasis instead being placed upon illustrating the principles of the invention.

5. DETAILED DESCRIPTION

In all of the figures of the present document, the same numerical reference signs designate similar elements and steps.

The present disclosure relates to a technique for generating optical forces through jet beams which field lines exhibit curvatures allowing micro or nanoparticles to be trapped or moved e.g. around obstacles. This is achieved through the use of a device comprising two or more parts of dielectric materials with different refractive indexes. The refractive indexes of the constitutive parts are higher than the surrounding host medium in which the micro or nanoparticles are trapped or moved. The constitutive parts are configured in such a way that at least two of the jet beams, originating from different contact areas (associated with different parts) of the device, recombine and contribute to the formation of a focused electromagnetic beam which direction of propagation is deflected in respect of a direction of propagation of an incoming electromagnetic wave illuminating the device.

Numerical simulations show that the deflection of a generated focused jet beam can be controlled by the parameters of the device in view of the surrounding host medium.

5.1 Topology

FIG. 1 illustrates the cross-section view, in the XZ-plane, of a device 100 comprising a first part 101 and a second part 102 according to an embodiment of the present disclosure.

The device 100 is configured to be in contact with a dielectric host medium 103 having a first refractive index $n_1$ and in which the micro or nanoparticles are intended to be trapped or moved by a focused electromagnetic beam radiated by the device 100 when an incoming electromagnetic wave IEM radiated by an electromagnetic source 100s illuminates at least one face of the device 100, named illumination face 100i. More particularly:

the first part 101 is made of a first material having a second refractive index $n_2$. The first part 101 has a first width $W_1$ along the X-axis (the X-axis corresponds in the chosen coordinate system to a direction of extension of the illumination face 100i); and the second part 102 is made of a second material having a third refractive index $n_3$, with $n_1<n_3<n_2$, and having a second width $W_2$ along the X-axis.

For instance, the first and second materials belong to the group comprising glass, plastic, a polymer material, oxides and nitrides.

The first part 101 and the second part 102 are located side by side along the X-axis with $W_1+W_2$ greater than the equivalent wavelength in the host medium, $\lambda$, of the incoming electromagnetic wave IEM radiated by the electromagnetic source 100s. The first part 101 and second part 102 extend along the Z-axis (the Z-axis is orthogonal to X-axis and thus to the illumination face 100i in the chosen coordinate system) from the illumination face 100i up to another face of the device 100, named radiating face 100r, opposite to the illumination face 100*i*. The first part 101 and second part 102 have respectively a first height H1 and a second height H2 along the Z-axis.

In the embodiment of FIG. 1, H1=H2. However, in other embodiments, the first height H1 and the second height H2 can be different. Indeed, simulations show that the technical effect of having the electromagnetic field lines of the outgoing focused electromagnetic beam presenting a curvature is achieved as long as |H2−H1|≤λ/4. Indeed, as long as this condition is fulfilled, having a difference between the first height H1 and the second height H2 does not lead to the creation of additional jet beams (or secondary lobes) in the focused electromagnetic beam radiated by the device 100.

Back to FIG. 1, the direction of propagation of the incoming electromagnetic wave IEM is orthogonal to the illumination face 100*i* (i.e. the direction of propagation of the incoming electromagnetic wave IEM radiated by the electromagnetic source 100*s* is parallel to the Z-axis).

However, in other embodiments, the direction of propagation of the incoming electromagnetic wave IEM may be tilted relative to the Z-axis as discussed below in relation with FIGS. 11*a* and 11*b*.

Back to FIG. 1, the first part 101 and the second part 102 have vertical edges parallel to the Z-axis. The radiating 100*r* and illumination 100*i* faces are orthogonal to the Z-axis, which corresponds to a base angle of 90°.

However, in other embodiments, some prismatic structures (with arbitrary base angles) can also be used for the device 100 as discussed below in relation with FIG. 12. Variation of the base angle value provides an additional degree of freedom in the control of the jet beams radiation.

Back to FIG. 1, the device 100 thus comprises:
  a first contact area 100*e*1 between the host medium 103 and the first part 101 when the device is in contact with the host medium 103. The first contact area 100*e*1 contributes to the radiation of a first jet beam, NJ1, in a near field zone of the device 1 when the incoming electromagnetic wave IEM illuminates at least the illumination face 100*i*;
  a second contact area 100*e*2 between the first part 101 and the second part 102. The second contact area 100*e*2 contributes to the radiation of a second jet beam, NJ2, in the near field zone of the device 1 when the incoming electromagnetic wave IEM illuminates at least the illumination face 100*i*; and
  a third contact area 100*e*3 between the second part 102 and the host medium 103 when the device 100 is in contact with the host medium 103. The third contact area 100*e*3 contributes to the radiation of a third jet beam, NJ3, in the near field zone of the device 1 when the incoming electromagnetic wave IEM illuminates at least the illumination face 100*i*.

More particularly, when the incoming electromagnetic wave IEM presents an oblique angle of incidence (i.e. the angle of incidence of the incoming electromagnetic wave IEM relative to a normal of the illumination face 100*i*), the incoming electromagnetic wave IEM illuminates the illumination face 100*i*, but also at least another lateral face of the device 100. Whatever the considered slant angles of incidence, the first contact area 100*e*1, the second contact area 100*e*2 and the third contact area 100*e*3 contribute respectively to the radiation of the first jet beam NJ1, of the second jet beam NJ2 and of the third jet beam NJ3. Such jet beams are obtained from the superposition of a plurality of contributions resulting from the diffraction or refraction of the incoming electromagnetic wave IEM by the different faces or contact areas (e.g. between parts) of the device 100. Thus, in any case the first contact area 100*e*1 contributes to the radiation of the first jet beam NJ1, the second contact area 100*e*2 contributes to the radiation of the second jet beam NJ2 and the third contact area 100*e*3 contributes to the radiation of the third jet beam NJ3.

Back to FIG. 1, the three jet beams, NJ1, NJ2 and NJ3 can intersect in different hot spots, where a hot spot corresponds to a point of highest EM power in the considered jet, or focused points, which locations are referenced as points A, B and C.

According to the present disclosure, the materials and size of the first part 101 and of the second part 102 can be optimized in order to manage the positions of the jet hot spots, EM powers, directions and angles of deviation of the three jet beams NJ1, NJ2 and NJ3. As a result, the device 100 behaves as if it was radiating a focused electromagnetic beam resulting from the combination of at least two beams among said first jet beam NJ1, second jet beam NJ2 and third jet beam NJ3. The device 100 can thus be configured for having a direction of propagation of the focused electromagnetic beam being tilted in respect of a direction of propagation of the incoming electromagnetic wave as a function of at least part of:
  the first refractive index n1, the second refractive index n2 and the third refractive index n3;
  the first width $W_1$ and the second width $W_2$; and
  the first height H1 and the second height H2.

5.2 Design Principles & Main Performance Characteristics

In this Section, a set of equations is provided for estimating example optimal combinations of materials and dimensions of the blocks for having a jet beam shift (i.e. having a tilt angle relative to the direction of propagation of the incoming electromagnetic wave) and deviation. As shown below, the hot spot position and the direction of beam deviation are sensitive to the sizes of constitutive parts. For devices with dimensions larger than a few wavelengths, the Fresnel diffraction phenomenon may have a huge impact.

5.2.1 Main Characteristics of the Generated Jet Beams

Generally, the beam-forming phenomenon appears on a contact area between two materials of different refractive indexes, and is associated with this contact area (e.g. contact area 100*e*1, 100*e*2 or 100*e*3 of the device 100 of FIG. 1) and the illumination face 100*i*.

More particularly, the jet beam radiation angle can be derived in relation to the Snell's law. For instance, in the case of the first contact area 100*e*1 of the device 100, when in contact with the dielectric host medium 103, the radiation angle of the first jet beam NJ1 associated with the first contact area 100*e*1 is determined using the approximate formula:

$$\Theta_{B1} \approx \frac{90° - \Theta_{TIR1}}{2}, \quad (1)$$

where $$\Theta_{TIR1} = \sin^{-1}\left(\frac{n_1}{n_2}\right)$$

is the corresponding critical angle of refraction under the assumption that $n_2 > n_1$.

It can be noted that in general, the point of intersection of two jet beams radiated from opposite sides of an element determines the focal length of that element behaving as a microlens. In a first approximation, in the case of a single material element, the focal length of the microlens can be characterized as the function of the width and index ratio of the materials inside and outside the lens. The radiated electromagnetic beam will be directed along the symmetry axis of the element and the focal length of the resulting microlens can be estimated as:

$$F = \frac{W_1 \gamma}{2}, \quad (2)$$

where $$\gamma = \frac{1}{\tan\Theta_{B1}}$$

and $W_1$ is the width of the element.

Back to FIG. 1, the second jet beam NJ2 associated with the second contact area 101e2 is refracted at the angle $\Theta_{B2}$ into the medium with higher refractive index. Assuming $n_2 > n_3$, the angle $\Theta_{B2}$ is obtained as:

$$\Theta_{B2} \approx \frac{90° - \Theta_{TIR2}}{2}, \quad (3)$$

where $$\Theta_{TIR2} = \sin^{-1}\left(\frac{n_3}{n_2}\right)$$

is the corresponding limit angle of refraction.

Accordingly, the third jet beam NJ3 associated with the third contact area 101e3 is refracted at the angle $\Theta_{B3}$ with:

$$\Theta_{B3} \approx \frac{90° - \Theta_{TIR3}}{2}. \quad (4)$$

where $$\Theta_{TIR3} = \sin^{-1}\left(\frac{n_1}{n_3}\right)$$

is the corresponding limit angle of refraction.

The length and intensity of the three jet beams NJ1, NJ2 and NJ3, are generally different. The maximal intensity and minimal length correspond to the beam with highest ratio between the refractive indexes, which corresponds to the first jet beam NJ1 refracted at the angle $\Theta_{B1}$ when $n_2 > n_3 > n_1$.

The behavior of the focused electromagnetic beam radiated by the device 100 may be explained when determining the points of intersection of the three jet beams NJ1, NJ2 and NJ3 radiated respectively at the angles $\Theta_{B1}$, $\Theta_{B2}$ and $\Theta_{B3}$.

The point A of intersection of the first NJ1 and second NJ2 jet beams has the coordinates $(W_A, H_A)$ in the XoZ coordinate system of FIG. 1. More particularly, based on the previous equations, $$W_A \approx \tan\Theta_{B2} \cdot H_A, \quad (5)$$

$$H_A \approx \frac{W_1}{\tan\Theta_{B1} + \tan\Theta_{B2}}$$

Defining $\Theta_{B4}$ as the angle of deviation of the focal point A from the axis of symmetry 101 as of the first part 101 with width W1, $$\tan\Theta_{B4} \approx \frac{\tan\Theta_{B1} - \tan\Theta_{B2}}{2} \quad (6)$$

In the same way, the first jet beam NJ1 and third jet beam NJ3 intersect at point B with the coordinates $(W_B, H_B)$, where:

$$W_B \approx \tan\Theta_{B3} \cdot H_B - W_2, \quad (7)$$

$$H_B \approx \frac{W_1 + W_2}{\tan\Theta_{B1} + \tan\Theta_{B3}}$$

Defining $\Theta_{B5}$ as the angle of deviation of the focal point B from the axis of a symmetry of the device 100 (i.e. the Z-axis in FIG. 1) with width W1+W2, $$\tan\Theta_{B5} \approx \frac{W_2 \tan\Theta_{B1} - W_1 \tan\Theta_{B3}}{W_1 + W_2} \quad (8)$$

The second NJ2 and third NJ3 jet beams intersect only if $n_3$ is above a critical value, i.e. if $n_3 \geq \sqrt{n_1 n_2}$. In this case the coordinates of the point C are determined as:

$$W_C \approx \tan\Theta_{B3} \cdot H_C - W_2, \quad (9)$$

$$H_c \approx \frac{W_2}{\tan\Theta_{B3} - \tan\Theta_{B2}}$$

In this case, defining $\Theta_{B6}$ as the angle of deviation of the focal point C from the axis of symmetry 102 as of the second part 102 with width W2, $$\tan\Theta_{B6} \approx \frac{\tan\Theta_{B2} + \tan\Theta_{B3}}{2} \quad (10)$$

The particular case where the three jet beams NJ1, NJ2 and NJ3 intersect at the same point for fixed refractive indexes of the two parts 101, 102 and of the host medium 103 can be obtained as the result of variation of the widths W1, W2 of the two parts 101, 102. In order to get an intersection of the three jet beams NJ1, NJ2 and NJ3 at one point, the ratio $W_1/W_2$ has to be equal to:

$$\frac{W_1}{W_2} \approx \frac{\tan\Theta_{B1} + \tan\Theta_{B2}}{\tan\Theta_{B3} - \tan\Theta_{B2}} \quad (11)$$

In this case, all three jet beams NJ1, NJ2 and NJ3 contribute to the total generated focused electromagnetic beam radiated by the device 100. Thus, the intensity of the generated focused electromagnetic beam is maximal.

Figure 2:
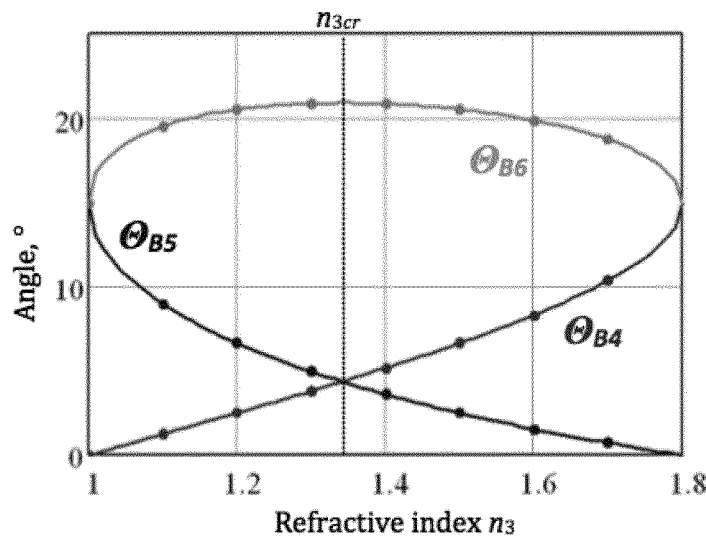
FIG. 2 illustrates the dependence on $n_3$ of the angles of deviation of the jet beams generated by the device of FIG. 1 when W1=W2.

The dependencies of the deviation angles $\Theta_{B4-B6}$ on the refractive index $n_3$ for the fixed value $n_2=1.8$ and $W_1=W_2$ are presented in FIG. 2. For the chosen parameters, the critical value $n_{3cr}$ of refractive index $n_3$ is given by, $n_{3cr}=\sqrt{n_1 n_2}=1.34$. In that case, the second NJ2 and third NJ3 jet beams intersect when $n_3 > n_{3cr}$. So, until $n_3$ reaches this critical value $n_{3cr}$, the angle $\Theta_{B6}$ has no meaning.

5.2.2 Parametric Study

Based on the identified properties of the device 100 depicted in FIG. 1, the parameters of the device 100 (i.e. the refractive index values, and/or the widths and/or the heights of the first part 101 and of the second part 102) may be adapted in order to obtain a tilt of the generated focused electromagnetic beam (resulting from the combination of at least two beams among the first jet beam NJ1, the second jet beam NJ2 and the third jet beam NJ3) in respect of the direction of propagation of the incoming electromagnetic wave IEM radiated by the electromagnetic source 100s.

Impact of the Respective Heights H1 and H2 of the First Part 101 and of the Second Part 102

The following numerical simulations have been performed assuming that H1=H2=H, W1=W2, and W=W1+W2 is greater than the equivalent wavelength in the host medium, $\lambda$, of the incoming electromagnetic wave IEM. However, as indicated in relation with FIG. 1, the technical effect of having the electromagnetic field lines of the outgoing focused electromagnetic beam presenting a curvature is achieved even if H1 and H2 are different from each other as long as $|H2-H1| \leq \lambda/4$.

Figure 3A:
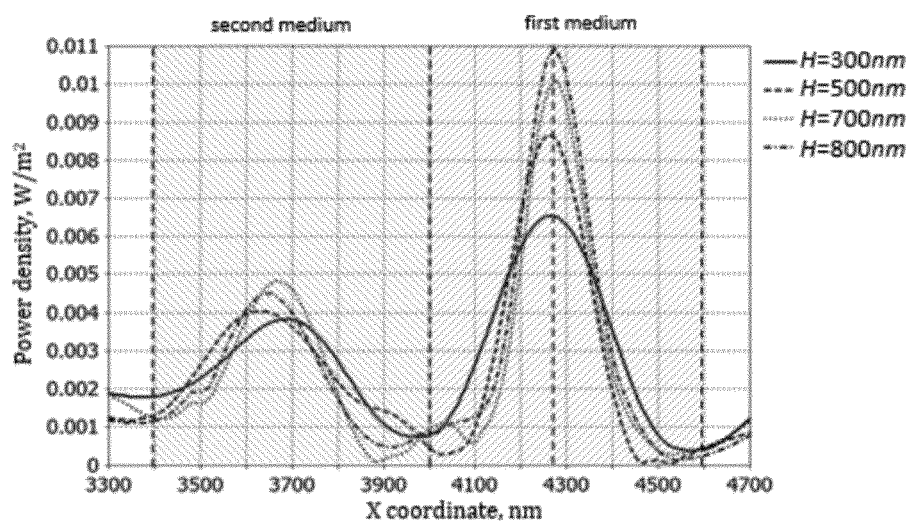
FIGS. 3a and 3b illustrate the power density distribution along the X-axis for the jet beams generated by the device of FIG. 1 when $\lambda$=550 nm, $n_1$=1, $n_2$=1.8, $W_1$=$W_2$=600 nm, and in the cut-plane $Z_0$=550 nm with $n_3$=1.3 (FIG. 3a); and in the cut-plane $Z_0$=1000 nm with $n_3$=1.6 (FIG. 3b)

Under the present assumptions, it can be shown that the hot spots positions of the generated jet beams are almost independent from the height H of the device 100 for $n_3 < \sqrt{n_1 n_2}$ as illustrated e.g. in FIG. 3a for $n_3=1.3$.

Figure 3B:
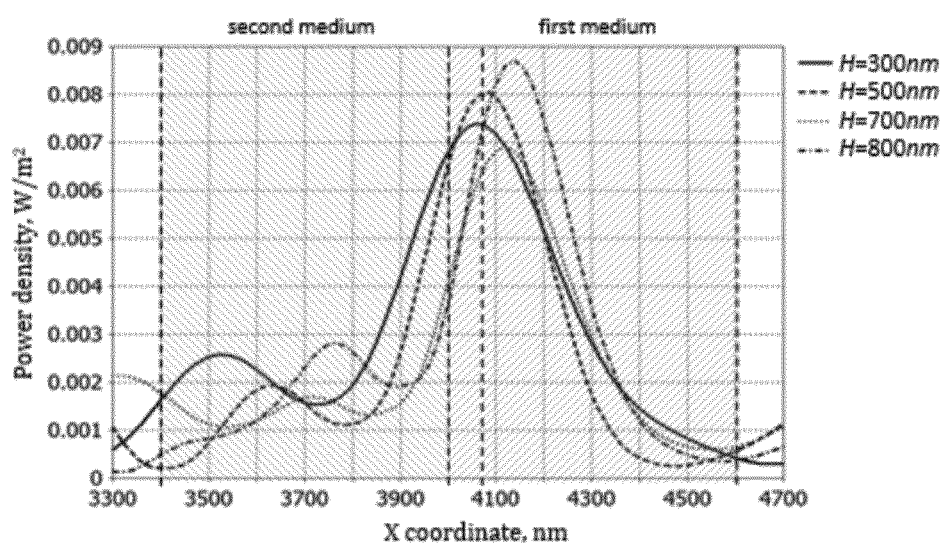

For $n_3 > \sqrt{n_1 n_2}$ and starting from $H1 \approx H_A$, a shift of the hot spot toward increasing X coordinates is observed. The power density distribution along the X-axis for $n_3=1.6$ is presented in FIG. 3b. For the parameters of the device 100 chosen for the simulation depicted in FIG. 3b, it appears that $H_A \approx 772$ nm.

Figure 4A:
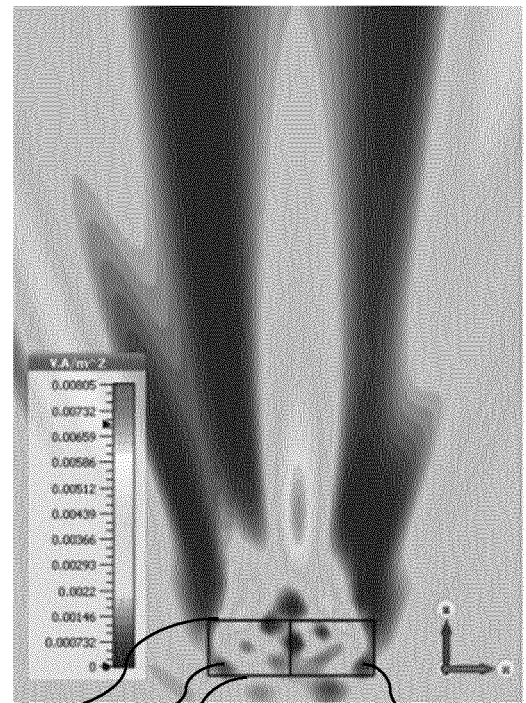
FIGS. 4a to 4c illustrate the power density distribution in the XZ-plane for the jet beams generated by the device of FIG. 1 when $\lambda$=550 nm, $n_1$=1, $n_2$=1.8, $n_3$=1.6, $W_1$=$W_2$=600 nm, and when H1=H2=400 nm (FIG. 4a), H1=H2=600 nm (FIG. 4b), H1=H2=900 nm (FIG. 4c)
Figure 4B:
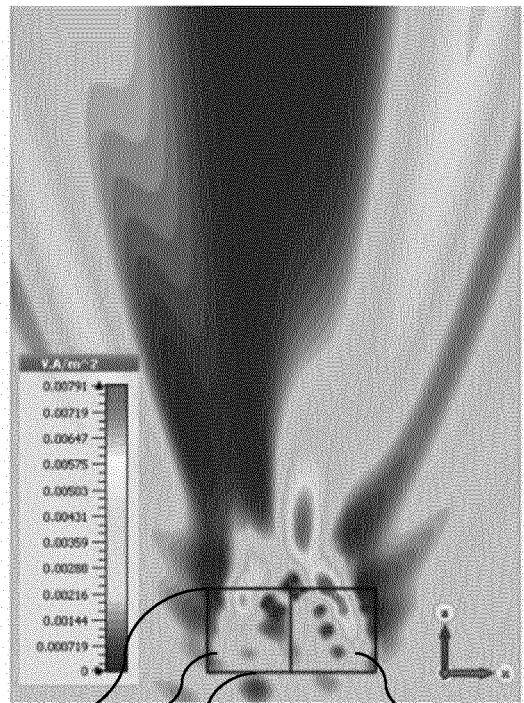
Figure 4C:
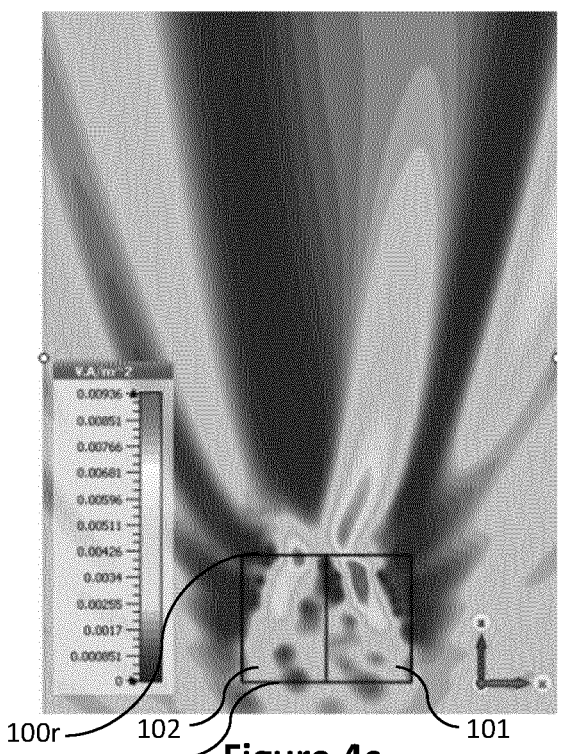

FIGS. 4a to 4c display the power density distribution in the XZ-plane for three different heights H=H1=H2 of the device 100 assuming that $n_3 > \sqrt{n_1 n_2}$. The power density distribution in question show that the curvature of the electromagnetic field lines of the outgoing focused electromagnetic beam is achieved by changing the height H of the device 100.

Figure 4D:
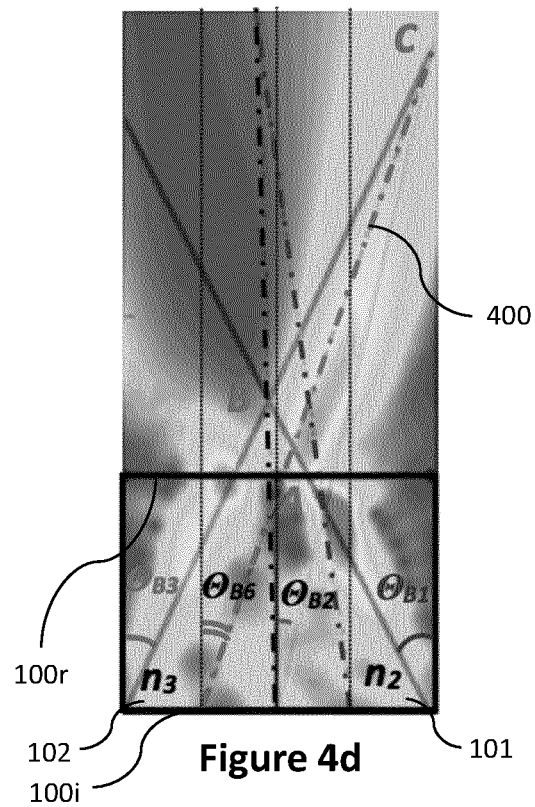
FIG. 4d illustrates the schematic distribution of the main jet beams in FIG. 4c.

FIG. 4d presents the schematic distribution of the jet beams created by the device 100. It appears that the curvature of the electromagnetic field lines of the outgoing focused electromagnetic beam takes place if $H1 \geq H_A$ and if the focal point A for the first jet beam Nil and the second jet beam NJ2 is close to the radiating surface 100r of the device 100, or even within the device 100 (see FIG. 4d). It can be seen, that in this case the curvature of the electromagnetic field lines of the outgoing focused electromagnetic beam is caused by an interplay of the second jet beam NJ2 and third jet beam NJ3, which are longer but less intensive than the first NJ1 jet beam. The angle of deviation of the generated focused electromagnetic beam is close to the angle $\Theta_{B6}$ of deviation of the focal point C from the axis of symmetry 102 as of the second part 102 with width W2 (dash-dot line 400 in FIG. 4d).

Figure 5A:
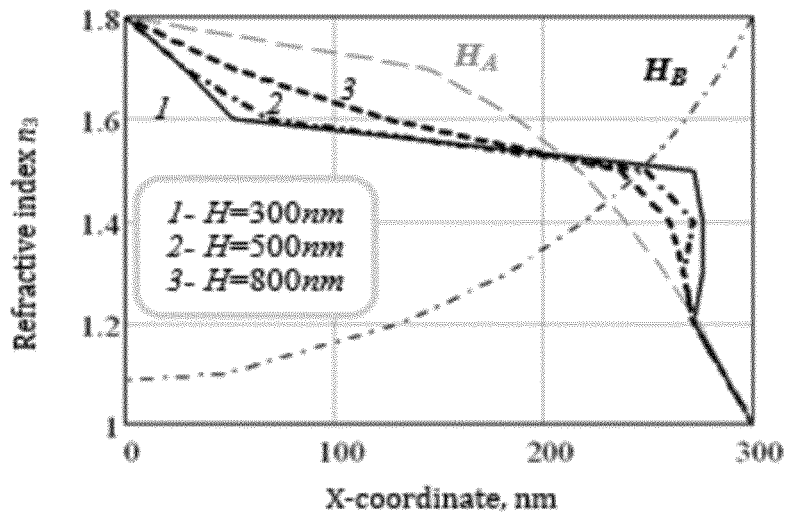
FIGS. 5a and 5b illustrate respectively the X and Z coordinates of the hot spot position of the jet beams generated by the device of FIG. 1 when $\lambda$=550 nm, n1=1, n2=1.8, W1=W2=300 nm and H1=H2=H for various values of n3 and various values of H.
Figure 5B:
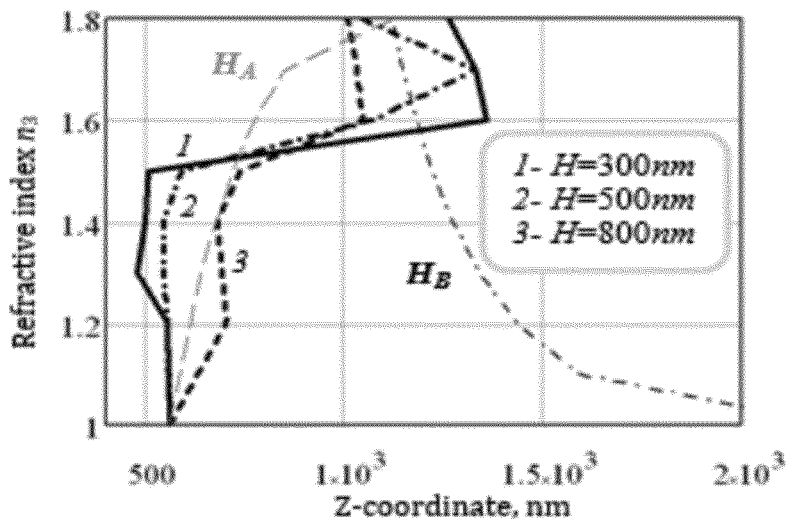
Figure 5C:
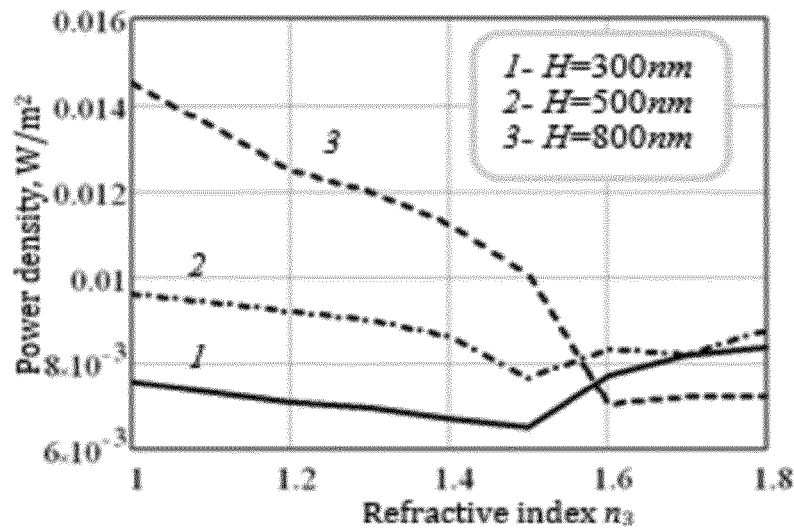
FIG. 5c illustrates the power density distribution of the hot spot generated by the device of FIG. 1 when $\lambda$=550 nm, n1=1, n2=1.8, W1=W2=300 nm and H1=H2=H for various values of n3 and various values of H.

FIGS. 5a and 5b show the dependencies of the hot spots positions of the jet beams generated by the device 100 (along the X and Z axis respectively) on the refractive index $n_3$ for three different heights H=H1=H2 of the device 100. More particularly, the light gray and the dash-dot lines indicate respectively the dependencies of the X and Z coordinates for points A and B on $n_3$. These two curves are obtained using equations (5) and (7). The power density of the hot spots as a function of $n_3$ is presented in FIG. 5c.

Figure 6A:
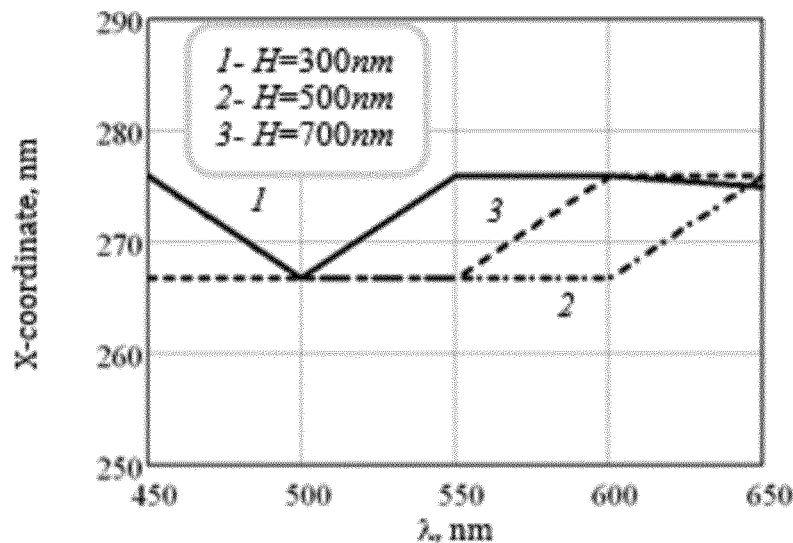
FIGS. 6a and 6b illustrate the X coordinate of the hot spot position of the jet beams generated by the device of FIG. 1 as a function of the equivalent wavelength in the host medium, $\lambda$, of the incoming electromagnetic wave when n1=1, n2=1.8, W1=W2=600 nm and when H1=H2=H, respectively for n3=1.3 (FIG. 6a) and for n3=1.6 (FIG. 6b)
Figure 6B:
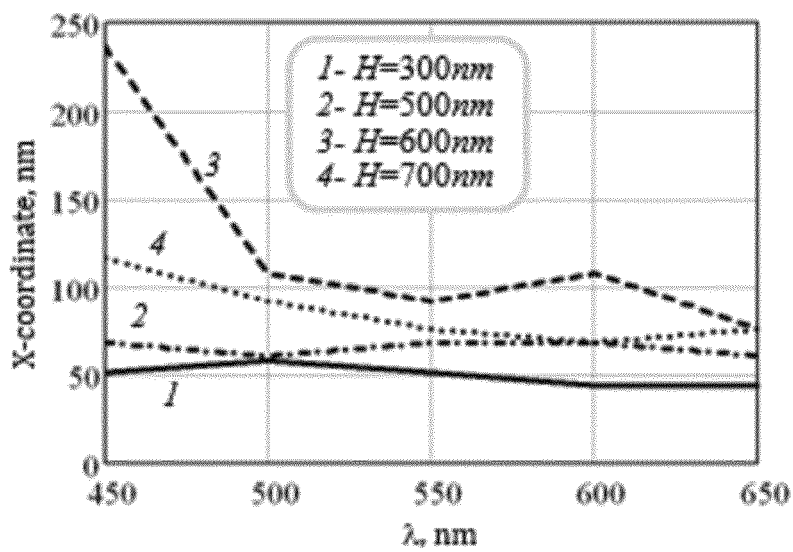

The equivalent wavelength in the host medium 2 of the incoming electromagnetic wave influences the hot spots positions of the generated jet beams. FIGS. 6a and 6b show the dependency of the hot spots shift on A for different heights H=H1=H2. For $n_3=1.3$, the shift of the hot spots is almost independent on the wavelength $\lambda$. The influence of the dispersion rises with the refractive index $n_3$ (see FIG. 6b for $n_3=1.6$).

Thus, in some embodiments of the present disclosure, the device 100 is configured such as $n_3 \geq \sqrt{n_1 n_1}$, $W_1=W_2$ and $H1 \geq H_A$, with $H_A$ the Z coordinate of the intersection point of the first jet beam NJ1 and of the second jet beam NJ2 (i.e. the height, along the Z-axis and relative to the illumination face 100i, of the intersection point of the first NJ1 and second NJ2 jet beams). This allows obtaining a tilt of the direction of the generated focused electromagnetic beam which is obtained from a combination of at least two beams among the first jet beam NJ1, the second jet beam NJ2 and the third jet beam NJ3 in respect of the direction of propagation of the incoming electromagnetic wave IEM.

Impact of the Respective Widths W1 and W2 of the First Part 101 and of the Second Part 102

This part of the description deals with the influence of the width W1 and W2 of the first part 101 and of the second part 102 of the device 100.

The influence of the width W2 of the second part 102, having the refractive index $n_3$, on the parameters of the generated jet beams is analyzed assuming a fixed width W1 of the first part 101 that has the refractive index $n_2$ ($n_2 > n_3 > n_1$).

More particularly, for $n_3 < \sqrt{n_1 n_2}$, two jet beams emerge in the proximity of the radiating face 100r of the device 100 when $W_2 > W_1$ as illustrated in FIG. 7a. It appears that the angles of deviation of the first jet beam NJ1 (beam number 1 in FIG. 7a) and of the second jet beam NJ2 (beam number 2 in FIG. 7a) are equal to $\Theta_{B4}$ and $\Theta_{B5}$ (see FIG. 7b). Thus, the position and the intensity of the hot spot (i.e. the point of highest intensity in the jet beam) of the second jet beam NJ2 depend on the width $W_2$.

The power density distribution along the X-axis at different widths W2 of the second part 102 of the device 100 is presented in FIG. 7c. It appears that the intensity and length of the second jet beam NJ2 rises with $W_2$. It also appears that increasing the total width W=W1+W2 of the device 100 increases the contribution of the Fresnel diffraction phenomenon into the total response of the system. Thus, the number of side jets of second type (or secondary lobes) deviated at an angle $\Theta_{B5}$ rises as $W_2$ increases.

Figure 8D:
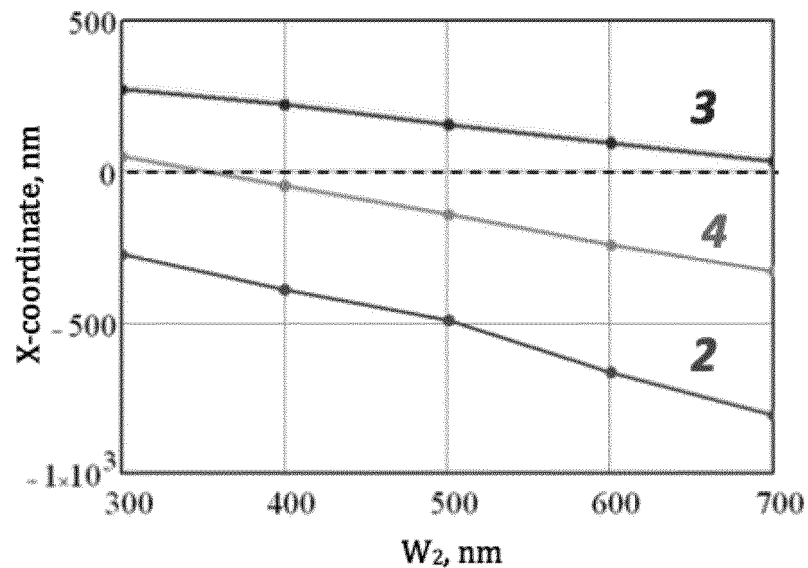
FIGS. 8d and 8e illustrate respectively the X and Z coordinates of the hot spots of the jet beams of FIGS. 8a and 8b as a function of $W_2$.
Figure 8E:
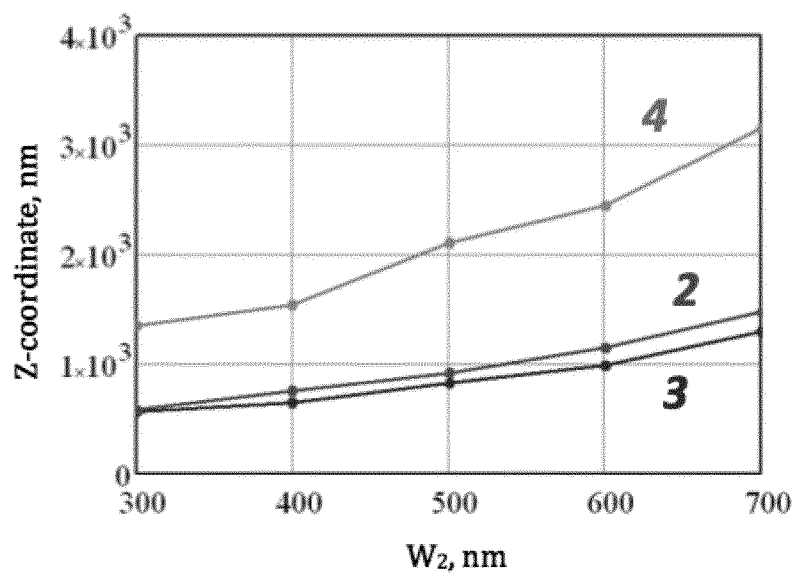

Alternatively, when $n_3 > \sqrt{n_1 n_2}$, two additional jet beams are obtained (e.g. as in the configuration of FIG. 8a). The angle of deviation of the third jet beam NJ3 (beam number 3 in FIG. 8a) associated with the third contact area 100e3 is equal to $\Theta_{B6}$ (see FIG. 8b). The central jet beam (beam number 4 in FIG. 8a) is directed along the Z-axis (normal to the radiating face 100r of the device). The power density in the hot spots of the jet beams number 2-4 in FIG. 8a and the positions of the corresponding jet beams' hot spots versus the width $W_2$ of the second part 102 are presented in FIGS. 8b to 8e. As discussed above in the case where $n_3 < \sqrt{n_1 n_2}$, the increase of $W_2$ increases the contribution of the Fresnel diffraction phenomenon into the total response of the system. Consequently, the number of side jets of second type (or secondary lobes) deviated at angles $\Theta_{B5}$ (left side when looking at the figures) and $\Theta_{B6}$ (right side when looking at the figures) increases as $W_2$ increases.

Thus, in some embodiments of the present disclosure, the device 100 is configured such that $n_3 < \sqrt{n_1 n_2}$, and W2>W1, independently of the heights H1 and H2 of the first part 101 and of the second part 102 of the device 100 (as long as the condition |H2−H1|≤λ/4 is fulfilled). Such parameters allow obtaining a tilt of the direction of the generated focused electromagnetic beam (that results from a combination of at least two beams among the first jet beam NJ1, the second jet beam NJ2 and the third jet beam NJ3) in respect of the direction of propagation of the incoming electromagnetic wave IEM radiated by the electromagnetic source 100s.

There is also an influence of the width W1 of the first part 101 having the refractive index $n_2$, on the parameters of the generated jet beams assuming a fixed width W2 of the second part 102 that has the refractive index $n_3$ ($n_2 > n_3 > n_1$).

In fact, a similar behavior can be observed as in the previous case discussed above where W2 was varying for a fixed value of W1. However, in the present case, the side jet beams (or secondary lobes) are deviated toward the angles $\Theta_{B4}$ (for the side jet beams on the left side when looking at the figures) and $\Theta_{B6}$ (for the side jet beams on the right side when looking at the figures). As mentioned above, in accordance with equation (11) the generated focused electromagnetic beam can be intensified based on some particular dimensions of the device 100. For the values of the parameters of the system as chosen in FIGS. 9a-d, the intersection of all the jet beams occurs when $W_1$=1960 nm. In FIG. 9d, the maximal intensity of the generated focused electromagnetic beam corresponds to $W_1 \approx 1600$ nm. The maximal benefit of the intersection of all jet beams at the same point will be observed at W≈λ, where W=W1+W2.

Thus, in some embodiments of the present disclosure, the device 100 is configured such that $n_3 < \sqrt{n_1 n_2}$, W2<W1, and H1≥$H_A$ (still with |H2−H1|≤λ/4). Such parameters allow obtaining a tilt of the direction of the generated focused electromagnetic beam (that results from a combination of at least two beams among the first jet beam NJ1, the second jet beam NJ2 and the third jet beam NJ3) in respect of the direction of propagation of the incoming electromagnetic wave IEM.

With the sizes $W_1 > W_2$, the deviation to the right (when looking at the figures) is observed for $n_3 < \sqrt{n_1 n_2}$ (e.g. as in the configuration of FIG. 102) and even at lower heights H1, H2 of the parts 101, 102 of the device 100 when $n_3 > \sqrt{n_1 n_2}$ as long as H1≈$H_A$−λ/2, (e.g. as in the configuration of FIG. 10b). Several factors are responsible for these phenomena. First of all, increasing the width $W_1$ increases the distance $H_A$. Thus, the main contribution to the total focused electromagnetic beam radiated by the device 100 comes from the longer jet beams NJ2 and NJ3 radiated at the angles $\Theta_{B2}$ and $\Theta_{B3}$.

Thus, in some embodiments of the present disclosure, the device 100 is configured such that $n_3 > \sqrt{n_1 n_2}$, W2<W1, and H1 is targeted to be equal to $H_A$−λ/2 (still with |H2−H1|≤λ/4). Such parameters allow obtaining a tilt of the direction of the generated focused electromagnetic beam (that results from a combination of at least two beams among the first jet beam NJ1, the second jet beam NJ2 and the third jet beam NJ3) in respect of the direction of propagation of the incoming electromagnetic wave IEM.

Impact of Illumination Conditions

Examination of power density distributions obtained for different oblique angles of incidence, a, (i.e. the angle of incidence of the incoming electromagnetic wave IEM relative to a normal of the illumination face 100i) shows that the tilt of the direction of the generated focused electromagnetic beam in respect of the normal to the radiating face 100r is sensitive to the height of the device 100.

For example, when the device 100 is in contact with a dielectric host medium 103 such that $n_1$=1, $n_2$=1.8, $n_3$=1.6, $W_1$=1000 nm, $W_2$=700 nm, H1=H2=H=300 nm and α=10°, the tilt angle γ of deviation of the generated focused electromagnetic beam from the normal incidence is equal to 14.49° and remains constant for all wavelengths of incident waves in the theoretical hypothesis of non-dispersive materials. The slight dispersion in the case of α=10° is observed for H=550 nm. Moreover, the angle γ is approximately equal to 17.54°. The dispersion of the system rises with the height H. The comparison of FIG. 11a and FIG. 11b shows that for H=900 nm, the dispersion for normal illumination is lower than the dispersion for an oblique one. Moreover, for α=10°, the angle γ of deviation of the generated focused electromagnetic beam changes from ≈21° to ≈18.9° for 450 nm<λ<650 nm. For this height H=H1=H2 of the device 100, the additional deviation is approximately equal to the angle of incidence. A similar behavior of the generated focused electromagnetic beam takes place for higher angles of incidence α. But in this case, the dispersion of deviation is higher. In some embodiments, the angle of incidence of the incoming EM wave 100i lays in the range of −20 degrees and +20 degrees. Preferably, such angle lays between −10 degrees and +10 degrees, more preferably between −5 degrees and +5 degrees.

One can note that the present simulations have been performed for H=H1=H2, however, as discussed above, the conclusion remains the same as long as |H2−H1|≤λ/4.

Impact of the Base Angle of the First Part 101 and of the Second Part 102

According to the embodiment of FIG. 12, a device 100' with nonvertical edges (i.e. edges not parallel to the Z-axis) is considered whereas the radiating 100r and illumination 100i faces both remain orthogonal to the Z-axis. αj (with j equal to 1, 2 or 3) represent the base angles of the contact areas 100'e1, 100'e2 and 100'e3. With αj different from 90°, the device 100' may correspond to a double-material prismatic device in contact with a dielectric host medium 103, with a refractive index n1<n3<n2.

It can be shown that for the device 100' with the base angles αj greater than 90°−$\Theta_{Bj}$, with j equal to 1, 2 or 3, the corresponding jet beam radiation angle can be determined using the approximate formula:

$$\Theta_{Bj} \approx \frac{90° - \Theta_{TIRj}^*}{2} \quad (12)$$

where the angles $\theta'_{TIRj}$ are the critical angles of refraction from the nonvertical edges, or contact areas 100'e1, 100'e2 and 100'e3.

To get the approximate formula for $\theta'_{TIRj}$, the changing of the position of the contact areas compared to the configuration of the device 100 of FIG. 1 is considered. As a result, the corresponding jet beams radiation angle can be estimated as:

$$\Theta_{Bj} \approx 90° - \frac{\Theta_{TIRj} + \alpha_j}{2} \quad (13)$$

These expressions can then be injected into the equations (4)-(11) for having a description of the behavior of the jet beams associated with the contact areas 100'e1, 100'e2 and 100'e3 of the device 100'.

To consider the effect of the first part 101' and of the second part 102' with nonvertical contact areas 100'e1, 100'e2 and 100'e3, simulation results are discussed below that show the influence of the height H1=H2=H of the first part 101' and of the second part 102' on the generated jet beams when the total width W'=W'1+W'2 is such that W'>λ with W'1=W'2. It is seen that the hot spot position is almost independent from the height H' of the device 100' that is in contact with the dielectric host medium 103 when $n_3 < \sqrt{n_1 n_2}$ (see FIG. 13a for $n_3$=1.3). For $n_3 > \sqrt{n_1 n_2}$ starting from the specific height H≈HA, a deviation of the hot spot to the right (when looking at the figure) is observed. The power density distribution along the X-axis for $n_3$=1.6 is presented in FIG. 13b. For the parameters of the device 100' and of the dielectric host medium 103 chosen in those FIGS. 13a and 13b, $H_A$≈718.96 nm.

FIGS. 14a to 14c display the power density distribution in the XZ-plane for 3 different heights H'=H'1=H'2 of the device 100' with $n_3 > \sqrt{n_1 n_2}$. It can be shown that for the device 100' with nonvertical contact areas 100'e1, 100'e2 and 100'e3, the deviation of the generated focused electromagnetic beam can also be achieved by changing the height H'=H'1=H'2 of the device 100'.

More particularly, FIGS. 15a to 15d represent the height $H_A$ and the deviation angle $\Theta_{B6}$ as obtained based on equations (5) and (10). FIG. 15a shows that varying the angle $\alpha_1$ at fixed angles $\alpha_2$ and $\alpha_3$ affects only the specific height $H_A$ without changing the angle $\Theta_{B6}$ (for the parameters chosen for the simulation plotted in FIG. 15a, $\Theta_{B6}$=22°). Conversely, decreasing or increasing the base angle $\alpha_2$ leads to the changing of both parameters $H_A$ and $\Theta_{B6}$ as can be seen in FIGS. 15b and 15c. For the minimal angle $\alpha_2$ a maximal deviation of the corresponding jet beam at minimal height H'=H'1=H'2 of the device 100' is obtained.

As can be seen in FIG. 15d, changing the base angle $\alpha_3$ affects the specific height $H_A$ (for the parameters chosen for the simulation plotted in FIG. 15d $H_A$=718.96 nm). The maximal deviation is observed for the minimal angle $\alpha_3$.

FIG. 16 gives the power density distribution along the X-axis in the cut-plane $Z_0$=1000 nm for four different values of the angle $\alpha_3$, with λ=550 nm, with $\alpha_1$=85°, $\alpha_2$=90° and with the device 100' having H'=H'1=H'2 greater than $H_A$.

5.3 Optical Manipulation Apparatus

FIGS. 17a to 19d relate to subwavelength optical manipulation of micro or nanoparticles by the curved jet beams generated by a device (e.g. device 100 or 100') according to the disclosure.

More particularly, the optical forces acting on arbitrary micro or nanoparticles can be obtained by approximating the particle by an electric dipole.

This method applies for Rayleigh particles (particles much smaller than the incident wavelength) as detailed for instance in the article by P. Chaumet and M. Nieto-Vesperinas: "*Time-averaged total force on a dipolar sphere in an electromagnetic field,*" Opt. Lett. 25, 1065-1067 (2000).

Using the dipole approximation for the subwavelength radius of the sphere, the force can be obtained as:

$$F = \frac{1}{2} \text{Re}(\chi) \sum_i \text{Re}(E_i \cdot \nabla E_i^*) + \frac{1}{2} \text{Im}(\chi) \sum_i \text{Im}(E_i \cdot \nabla E_i^*). \quad (14)$$

where $$\chi = \pi n_m^2 a^3 \frac{m^2 - 1}{m^2 + 2}$$

is the particle's complex polarizability, $$m = \frac{n_p}{n_m}, n_p$$

is the refractive index of the material of the particle, $n_m$ is the refractive index of the medium outside the particle and a is the radius of the particle.

The forces produced by the deviated jet beams in the presence or not of obstacles 1800 have been simulated using Comsol software and based on the dipolar approximation for gold particles with a radius of 0.03 μm and a dielectric permittivity ε=−11.208+1.31184i. Further, those forces have been simulated on one hand for a single material device 1710 having a refractive index n, and for the dual-material device 100 of FIG. 1.

In FIGS. 17a and 17b, the device is illuminated by a TM (for "Transverse magnetic") polarized incoming electromagnetic wave IEM with λ=550 nm and α=0° (i.e. the incoming electromagnetic wave IEM has a direction of propagation orthogonal to the illumination face 100i of the device 100). The single material device 1710 is made of the same material as the first part 101 of the device 100, i.e. $n=n_1=n_2$. Further, the single material device 1710 has the same width W as the device 100, with W=W1+W2=2*600 nm ($W_1=W_2$), and the same height H=H1=H2=900 nm. The streamlines and arrows show the trajectories and directions of the optical forces obtained using the dipolar approximation. It is possible to see that in case of double material device 100, it is possible to transport the particles along the curved trajectory.

Referring to FIGS. 18a to 19d, an obstacle 1800 is placed along the jet beams paths. The length of the obstacle 1800 in X-direction coincides with the width W1 of the first part 101 of the device 100. However, the obstacle 1800 is shifted between the axis of symmetry of the obstacle 1800 and the axis of symmetry the first part 101 by an offset equal to $W_1$/4. The same configuration is used for the single material device 1710. The simulations correspond to an obstacle 1800 made of glass with a refractive index 1.8 and a thickness equal to λ/8 placed at the distance 5λ/8 in the case of FIGS. 18a to 18d, and made of metal (which is a perfect electric conductor) with the same thickness λ/8 placed at the distance 3λ/8 in the case of FIGS. 19a to 19d. The presence of the obstacle 1800 leads to the disruption of the jet beams and to valuable changing in the trajectory. By increasing the refractive index of the single material device 1710, the curved trajectory is obtained but the forces pushing the particle away from the device 100 are very small. Only the double-material device 100 (here with the height H=H1=H2=900 nm) can generate the deviated jet beam. In that case, the particles can move along the curved trajectory around the obstacle. This effect was obtained for both type of obstacles 1800 (i.e. glass and metal). Moreover, in case of a conducting obstacle 1800, trapping locations near the obstacle can be obtained (white circle referred 1900 in FIG. 19c).

Thus, such double-material device 100, 100' according to the disclosure (in any of its embodiments discussed above)

can be used as an elementary part of an optical manipulation apparatus (e.g. an optical tweezer) 1700 for trapping or moving micro or nanoparticles in the dielectric host medium 103. For instance, the equivalent wavelength in the host medium, λ, of the incoming electromagnetic wave IEM belongs to the visible light spectrum (e.g. the wavelength in the host medium 2 lays between 400 nm and 700 nm, or equivalently the frequency of the incoming IEM wave lays between 430 THz to 790 THz). Thus, devices with nano-scale dimensions can be obtained for forming visible light wave patterns. In other embodiments, the frequency of the incoming IEM wave belongs to the group comprising:

radio waves, i.e. between 30 Hz to 300 GHz;
microwaves, i.e. 1 GHz to 100 GHz;
terahertz radiations, i.e. 100 GHz to 30 THz;
infrared, i.e. 300 GHz to 430 THz; and
ultraviolet, i.e. 790 THz to 30 PHz.

In those embodiments, the size of the device 100, 100' is thus scaled according to the wavelength of the incoming IEM wave in order to achieve the tilt of the generated focused electromagnetic beam.

In some embodiments, an optical manipulation system comprises the optical manipulation apparatus 1700 and the electromagnetic source 100s for radiating the incoming electromagnetic wave IEM that illuminates the illumination face 100i of the device 100, 100' (in any of its embodiments discussed above).

The invention claimed is:

1. A device configured to radiate a focused electromagnetic beam in a dielectric host medium having a first refractive index $n_1$ when an incoming electromagnetic wave illuminates a first face of the device, wherein the device comprises:
   a first material having a second refractive index $n_2$ and having a first width $W_1$ along a first direction of extension of the first face; and
   a second material in contact with the first material and having a third refractive index $n_3$, wherein the second material has a second width $W_2$ along the first direction, where $n1<n3<n2$, and where $W_1+W_2$ is greater than a wavelength λ in the host medium of the incoming electromagnetic wave, the first material and the second material extending along a second direction orthogonal to the first face from the first face up to a radiating face of each material, opposite to the first face, the first material and the second material having respectively a first height H1 and a second height H2 along the second direction, where $|H2-H1| \le \lambda/4$;
   wherein the device comprises, when the device is in contact with the dielectric host medium and when the incoming electromagnetic wave illuminates the first face:
   a first contact area between the dielectric host medium and the first material, the first contact area radiating a first jet beam in a near field zone;
   a second contact area between the first material and the second material, the second contact area radiating a second jet beam in the near field zone; and
   a third contact area between the second material and the dielectric host medium, the third contact area radiating a third jet beam in the near field zone,
   wherein the focused electromagnetic beam results from a combination of at least two beams among the first jet beam, the second jet beam, and the third jet beam, wherein a direction of propagation of the focused electromagnetic beam is tilted with respect to a direction of propagation of the incoming electromagnetic wave.

2. The device according to claim 1, wherein the direction of propagation of the focused electromagnetic beam is tilted with respect to a direction of propagation of the incoming electromagnetic wave as a function of at least part of:
   the first refractive index $n_1$, the second refractive index $n_2$, and the third refractive index $n_3$;
   the first width $W_1$ and the second width $W_2$; and
   the first height H1 and the second height H2.

3. The device according to claim 1, wherein the focused electromagnetic beam results from a combination of the first jet beam, the second jet beam, and the third jet beam.

4. The device according to claim 1,
   wherein $n_3 \ge \sqrt{n_1 n_2}$,
   wherein $W_1 = W_2$, and
   wherein $H1 \ge H_A$, with $H_A$ a height, along the second direction and relative to the first face, of the intersection point of the first jet beam and the second jet beam.

5. The device according to claim 1, wherein $n_3 < \sqrt{n_1 n_2}$ and wherein $W_2 > W_1$.

6. The device according to claim 1,
   wherein $n_3 < \sqrt{n_1 n_2}$,
   wherein $W_2 < W_1$, and
   wherein $H1 \ge H_A$, with $H_A$ the height, along the Z-axis and relative to the first face, of an intersection point of the first jet beam and the second jet beam.

7. The device according to claim 1,
   wherein $n_3 < \sqrt{n_1 n_2}$,
   wherein $W_2 < W_1$, and
   wherein H1 is targeted to be equal to $H_A - \lambda/2$, with $H_A$ the height, along the second direction and relative to the first face, of an intersection point of the first jet beam and the second jet beam.

8. The device according to claim 4, wherein the height $$H_A = \frac{W_1}{\tan\Theta_{B1} + \tan\Theta_{B2}},$$

where $\Theta_{B1}$ and $\Theta_{B2}$ are, respectively, radiation tilt angles of the first jet beam and the second jet beam with respect to the direction of propagation of the incoming electromagnetic wave.

9. The device according to claim 8,
wherein $\Theta_{B1}$ is equal to $$90° - \frac{\Theta_{TIR1} + \alpha_1}{2}$$

and $\Theta_{B2}$ is equal to $$90° - \frac{\Theta_{TIR2} + \alpha_2}{2},$$

where angles $\alpha_1$ and $\alpha_2$ are respectively base angles of the first contact area and of the second contact area relative to the first direction, and
where $\Theta_{TIR1}$ and $\Theta_{TIR2}$ are limit angles of refraction associated with, respectively, the first contact area and the third contact area.

10. The device according to claim 9, wherein $$\Theta_{TIR1} = \sin^{-1}\left(\frac{n_1}{n_2}\right) \text{ and }$$

$$\Theta_{TIR2} = \sin^{-1}\left(\frac{n_3}{n_2}\right).$$

11. The device according to claim 1, wherein the wavelength λ in the host medium of the incoming electromagnetic wave belongs to the visible light spectrum.

12. The device according to claim 1, wherein at least one of the first material and second the material is selected from the group consisting of glass, plastic, a polymer material, oxides, and nitrides.

13. An optical manipulation system comprising:
a device configured to radiate a focused electromagnetic beam in a dielectric host medium having a first refractive index $n_1$ when an incoming electromagnetic wave illuminates a first face of the device, wherein the device comprises:
  a first material having a second refractive index $n_2$ and having a first width $W_1$ along a first direction of extension of the first face; and
  a second material in contact with the first material and having a third refractive index $n_3$, wherein the second material has a second width $W_2$ along the first direction,
  where n1<n3<n2, and where $W_1+W_2$ is greater than a wavelength λ in the host medium of the incoming electromagnetic wave, the first material and the second material extending along a second direction orthogonal to the first face from the first face up to a radiating face of each material, opposite to the first face, the first material and the second material having respectively a first height H1 and a second height H2 along the second direction, where |H2−H1|≤λ/4;
wherein the device comprises, when the device is in contact with the dielectric host medium and when the incoming electromagnetic wave illuminates the first face:
  a first contact area between the dielectric host medium and the first material, the first contact area radiating a first jet beam in a near field zone;
  a second contact area between the first material and the second material, the second contact area radiating a second jet beam in the near field zone; and
  a third contact area between the second material and the dielectric host medium, the third contact area radiating a third jet beam in the near field zone,
  wherein the focused electromagnetic beam results from a combination of at least two beams among the first jet beam, the second jet beam, and the third jet beam, wherein a direction of propagation of the focused electromagnetic beam is tilted with respect to a direction of propagation of the incoming electromagnetic wave; and
an electromagnetic source configured to generate the incoming electromagnetic wave.

14. The device according to claim 1, wherein the device is configured to trap or move microparticles or nanoparticles in the dielectric host medium.

15. A method comprising:
trapping or moving micro or nanoparticles in a dielectric host medium,
wherein trapping or moving the micro or nanoparticles in the dielectric host medium uses a device configured to radiate a focused electromagnetic beam in a dielectric host medium having a first refractive index $n_1$ when an incoming electromagnetic wave illuminates a first face of the device, wherein the device comprises:
  a first material having a second refractive index $n_2$ and having a first width $W_1$ along a first direction of extension of the first face; and
  a second material in contact with the first material and having a third refractive index $n_3$, wherein the second material has a second width $W_2$ along the first direction,
  where n1<n3<n2, and where $W_1+W_2$ is greater than a wavelength λ in the host medium of the incoming electromagnetic wave, the first material and the second material extending along a second direction orthogonal to the first face from the first face up to a radiating face of each material, opposite to the first face, the first material and the second material having respectively a first height H1 and a second height H2 along the second direction, where |H2−H1|≤µ/4;
wherein the device comprises, when the device is in contact with the dielectric host medium and when the incoming electromagnetic wave illuminates the first face:
  a first contact area between the dielectric host medium and the first material, the first contact area radiating a first jet beam in a near field zone;
  a second contact area between the first material and the second material, the second contact area radiating a second jet beam in the near field zone; and
  a third contact area between the second material and the dielectric host medium, the third contact area radiating a third jet beam in the near field zone,
  wherein the focused electromagnetic beam results from a combination of at least two beams among the first jet beam, the second jet beam, and the third jet beam, wherein a direction of propagation of the focused electromagnetic beam is tilted with respect to a direction of propagation of the incoming electromagnetic wave.

16. The device according to claim 1, wherein the host medium surrounds the device.

17. The optical manipulation system according to claim 13, wherein the host medium surrounds the device.

18. The method according to claim 15, wherein the host medium surrounds the device.

* * * * *